United States Patent

Yoshimura et al.

[11] Patent Number: 6,125,397
[45] Date of Patent: Sep. 26, 2000

[54] DATA TRANSFER APPARATUS AND METHOD USING CONGESTION RECOVERY-TYPE AND CONGESTION AVOIDANCE-TYPE DATA TRANSFERS

[75] Inventors: Kouichi Yoshimura; Koh Kamizawa; Katsuya Mitsutake, all of Nakai-machi, Japan

[73] Assignee: Fuji Xerox Co., Ltd., Tokyo, Japan

[21] Appl. No.: 09/089,219

[22] Filed: Jun. 3, 1998

[30] Foreign Application Priority Data

Jun. 3, 1997 [JP] Japan .................................. 9-144791

[51] Int. Cl.[7] ........................................................ G06F 15/15
[52] U.S. Cl. ........................ 709/235; 709/200; 709/224; 709/226; 709/232; 709/233; 370/229; 370/232; 370/235; 370/230
[58] Field of Search .................................. 709/223–224, 709/226, 232–236, 250, 200; 370/229–239, 253, 412–418

[56] References Cited

U.S. PATENT DOCUMENTS

| | | | |
|---|---|---|---|
| 5,400,329 | 3/1995 | Tokura et al. | 370/232 |
| 5,633,861 | 5/1997 | Hanson et al. | 370/232 |
| 5,638,363 | 6/1997 | Gittins et al. | 370/358 |
| 5,694,390 | 12/1997 | Yamato et al. | 370/230 |
| 5,799,002 | 8/1998 | Krishnan | 370/234 |
| 5,901,140 | 5/1999 | Van As et al. | 370/236 |
| 5,940,370 | 8/1999 | Curtis et al. | 709/235 |
| 5,970,048 | 10/1999 | Pajuvirta et al. | 370/230 |

FOREIGN PATENT DOCUMENTS 9-214555  8/1997  Japan ............................. H04L 12/56

Primary Examiner—Ahmad F. Matar
Assistant Examiner—Bharat Barot
Attorney, Agent, or Firm—Oliff & Berridge, PLC

[57] ABSTRACT

A data transfer apparatus and method uses recovery-type congestion control and avoidance-type congestion control. A bandwidth determination unit determines a requested bandwidth for a congestion avoidance-type data transfer in accordance with control information communicated between applications prior to the congestion avoidance-type data transfer. A bandwidth estimation unit estimates a bandwidth having been used by a congestion recovery-type data transfer in accordance with the control information communicated between applications prior to the congestion recovery-type data transfer. A management information memory stores information data of all the congestion avoidance-type data transfers and congestion recovery-type data transfers that use the bandwidth at a particular moment (i.e., simultaneously). A bandwidth allocation unit determines whether a newly requested congestion avoidance-type data transfer can be performed in accordance with an unused bandwidth and a bandwidth requested by the new data transfer, and allocates a certain amount of bandwidth to the new congestion avoidance-type data transfer. A data transfer instruction unit instructs an application to perform new data transfer.

36 Claims, 27 Drawing Sheets

DATA TRANSFER MANAGEMENT TABLE

|   | APPLICATION NAME | SENDER ADDRESS |
|---|---|---|
| 1 | | |
| 2 | | |
| 3 | | |

BANDWIDTH STATISTICS TABLE

| NUMBER OF DATA TRANSFERS | TOTAL RECEIVING TIME [SEC] | TOTAL NUMBER OF RECEIVED PACKETS |
|---|---|---|
| 1 | | |
| 2 | | |
| 3 | | |
| 4 | | |
| 5 | | |

RESOURCE-MANAGEMENT TABLE

|   | PROTOCOL IDENTIFIER | SENDER ADDRESS | RECEIVER ADDRESS | BANDWIDTH [Mbps] |
|---|---|---|---|---|
| 1 | | | | |
| 2 | | | | |
| 3 | | | | |

⋮

IN A CASE OF lpr, PRIOR TO THE TRANSFER OF
A PRINT JOB FROM A CLIENT TO A SERVER,
CONNECTION TO TCP PORT 505 IS PERFORMED

|  | ⋮ | | |
|---|---|---|---|
| | INFORMATION FOR DATALINK LAYER PROTOCOL ||||
| IP LAYER | VERS | LEN | TYPE OF SERVICE | TOTAL LENGTH |
| | IDENT || FLAGS | FRAGMENT OFFSET |
| | TIME | PROTO | HEADER CHECKSUM ||
| | SOURCE IP ADDRESS ||||
| | DESTINATION IP ADDRESS ||||
| | OPTIONS ||| PADDING |
| TCP LAYER | SOURCE PORT || DESTINATION PORT ||
| | SEQUENCE NUMBER ||||
| | ACKNOWLEDGMENT NUMBER ||||
| | OFF. | RES. | CODE | WINDOW |
| | CHECKSUM ||| URGENT POINT |
| | OPTIONS ||| PADDING |
| | INFORMATION FOR THE HIGHER LAYER PROTOCOL ||||

⋮

FIELD OF IP LAYER  PROTO: PROTOCOL IDENTIFIER OF
THE HIGHER LAYER   (ex. TCP=6)
SOURCE IP ADDRESS: SENDER IP ADDRESS
DESTINATION IP ADDRESS: RECEIVER IP ADDRESS

FIELD OF TCP LAYER  SOURCE PORT: TRANSMISSION PORT NUMBER
DESTINATION PORT: RECEPTION PORT NUMBER

FIG. 28

PROTOCOL INFORMATION TABLE

| | PROTOCOL IDENTIFIER | CONGESTION CONTROL TYPE | CONNECTION TYPE | CONNECTION ESTABLISHMENT SEQUENCE | CONNECTION RELEASING SEQUENCE |
|---|---|---|---|---|---|
| 1 | | | | | |
| 2 | | | | | |
| 3 | | | | | |

⋮

CONGESTION CONTROL TYPE-
    1: RECOVERY-TYPE CONGESTION CONTROL
    0: AVOIDANCE-TYPE CONGESTION CONTROL

CONNECTION TYPE-
    1: CONNECTION-ORIENTED
    0: OTHERS

FIG. 29

DATA TRANSFER MANAGEMENT TABLE

| | PROTOCOL IDENTIFIER | SENDER ADDRESS | RECEIVER ADDRESS | CONNECTION PORT NUMBER |
|---|---|---|---|---|
| 1 | | | | |
| 2 | | | | |
| 3 | | | | |

DATA TRANSFER APPARATUS AND METHOD USING CONGESTION RECOVERY-TYPE AND CONGESTION AVOIDANCE-TYPE DATA TRANSFERS

BACKGROUND OF THE INVENTION

1. Field of Invention

This invention relates to data transfer apparatus and methods appropriate for an environment where plural computers share a network and transfer data.

2. Description of Related Art

Initially, a computer network where this invention can be used is explained.

FIG. 1 shows a schematic configuration of a computer network. In this figure, plural computers 100 are located at physically distributed places. These computers 100 are connected with each other by network 101. Each computer 100 has applications (application programs) 102. Data communication control program 103 executes data communications requested by the applications 102 in accordance with a certain procedure. The network 101 is a transmission medium used for data communication. Thus, the computers 100 perform data transfer requested by the applications 102. This configuration is generally known as a LAN (Local Area Network) and conventionally employed in Ethernet.

In this computer network, applications 102 on the distributed computers 100 are the substantial entities of data transfer. Total data transfers and transmission rate are restricted in accordance with the functions of applications 102 as described below.

(1) Data transfer of control data among distributed applications 102

The objective is to communicate control information between distributed applications 102.

Some kilobyte (1 kilo=1,000) of data is transferred at a time. For example, the amount of data transferred by using RPC (IETF RFC1057) is 1.5 kilobyte.

The restriction on transmission delay is high. (In other words, significant transmission delays are not acceptable.)

(2) Data transfer of the results processed by an application 102

The objective is mainly to transfer result data that is processed and stored to the computer that requests the result data. An example of such data is an image to be printed.

From some hundred kilobyte to some hundred megabyte (1 megabyte=1,000,000) of data is transmitted at a time. The amount of data to be transferred differs according to the contents of the data or the total amount of processing. For example, the amount of data of an A4 size, 400 dpi monochrome 16 tone level image print is about 8 megabytes.

The restriction on transmission delay is comparatively low. Meanwhile, the requirement for a line rate or bandwidth of the transmission medium depends on the amount of data to be transferred, and can be very high.

Since both cases are used for communication between computers, data transfers should satisfy the following requirements. The data communication control program 103 executes the process that satisfies the requirements in a unit of a packet.

1) Recovery from a transmission error. In other words, execution of an acknowledgment sequence.

2) When the application 102 is invoked, data is transferred immediately.

This is generally called connectionless communication. The connectionless communication always keeps a network available while computers are activated.

Meanwhile, the network 101 is the transmission medium for data transfer. The transmission medium includes transmission paths and a packet switch that connects transmission paths. This type of network 101 is generally called a switch-type packet switching network. The packet switch has a buffer 101a (see FIG. 2) that stores a packet temporarily for each transmission path.

Next, a conventional data transfer apparatus used on a computer network is explained. FIG. 2 shows a schematic configuration of the conventional data transfer apparatus. In the figure, congestion detector 104 is a feedback controller that detects a congestion state, which is explained below, on the network 101 and informs a sender of the congestion state. Recovery-type bandwidth controller 105 provided on a sender begins data transfer at the requested transmission rate or the maximum transmission rate thereof, when the application 102 requests a data transfer. In addition, while receiving a congestion state message from the congestion detector 104, the recovery-type bandwidth controller 105 executes a procedure for recovery from the congestion state by reducing the transmission of packet data or decreasing the transmission rate.

The reason why this control is required is now explained. Data transfer between computers occupies the network, i.e., the transmission medium, for a certain time period. The degree of the occupancy is the amount of network resource used by a data transfer. Specifically, the amount of network resource used by a data transfer is defined by a bandwidth used by the data transfer between a sender and a receiver, and the time duration of the data transfer.

In LAN, computers or applications are simultaneously connected with the fixed transmission medium (transmission path) in such a manner that both the scale and cost of configuration of the transmission medium are minimized. Therefore, in the network described above, conflict between transmission requests should be controlled.

A network resource provided by a transmission medium is limited. As a result of conflict, when the amount of the network resource requested by data transfers exceeds the capacity of the network resource, part of the packet data is lost. This is called a congestion state. The sender is required to prevent data from being lost by controlling the transmission of packets, so as to satisfy the above-described requirements 1) and 2). This is called congestion control.

Meanwhile, when the large volume of result data is transmitted in a short period, the congestion control described above sometimes is not used. Instead, prior to a data transfer, a specific transmission path is established on the network so as to occupy the network resource for a certain time period. There are two ways for establishing a transmission path as follows.

[1] A transmission path is established when an application is invoked (e.g., line switching like a telephone network)

[2] A transmission path is established dynamically at the time of a data transfer after the application is invoked (e.g., RSVP: A New Resource ReSerVation Protocol)

FIG. 3 shows a schematic configuration of a data transfer apparatus that establishes a transmission path dynamically at the time of a data transfer. In the figure, avoidance-type bandwidth controller 106 transmits a transmission request to resource allocation section 107 prior to a data transfer. When receiving the transmission request from avoidance-type bandwidth controller 106, resource allocation section 107 establishes a transmission path and instructs the avoidance-type bandwidth controller 106 to start the data transfer. When establishing a transmission path, the transmission rate is determined on the condition that the maximum bandwidth of the transmission medium is known and can be occupied. The amount of the used bandwidth of the transmission medium is not monitored.

To summarize, there are the following two methods of congestion control.

(1) Recovery-type congestion control (FIG. 2):
 Premise: The capacity of a network resource and the amount of the network resource used by other data transfers are not known.
 Principle: A data transfer is started by using the network resource requested by an application. When occurrence of congestion is fed back, the bandwidth for the data transfer is decreased in order to recover from the congestion state.
 Feature: Each sender can start data transfer at any time without delay.
 Characteristic: Transmission efficiency is good when the load of the network is low. Meanwhile, transmission efficiency is poor when the load of the network is high. Transmission efficiency is independent from the amount of data by a single data transfer.
 Prior Art: ABR (Available Bit Rate), TCP (Transmission Control Protocol)

(2) Avoidance-type congestion control (FIG. 3):
 Premise: The capacity of a network resource and the amount of the network resource used by other similar data transfers are known.
 Principle: The network resource is allocated for each data transfer according to a report of the network resource requested by an application and the amount of the unused network resource. Thus, congestion states are prevented from occurring.
 Feature: There is a delay between the request of the data transfer and the start thereof.
 Characteristic: Transmission efficiency is good when the amount of data by a single data transfer is large. Meanwhile, transmission efficiency is poor when the amount of data by a single data transfer is small. The transmission efficiency is independent from the load of a network.
 Prior art: RSVP Recently, the amount of data requested by applications has increased sharply. However, LAN is also requested to accept the conventional small amount of data (e.g., control data) simultaneously. Therefore, it is desirable for a network to have the merits of the two types of the congestion control methods described above.

SUMMARY OF THE INVENTION

The present invention has been made in view of the above circumstances. An aspect of the present invention is to allow the recovery-type congestion control and the avoidance-type congestion control to coexist on a computer network, preferably without dividing or reconfiguring the network. Here, coexistence means that the congestion state can be controlled when the congestion avoidance-type data transfer and the congestion recovery-type data transfer are performed through a transmission path and share a network resource on the transmission path.

To achieve the above and/or other aspects, the invention provides a data transfer apparatus in a network system including a first computer and plural second computers, all computers connected by a network with each other. The plural second computers perform data transfers to the first computer simultaneously through an identical path on the network in accordance with requests from applications. The data transfer apparatus comprises a congestion detector, a first transfer controller, a resource monitor, an allocation unit, and a second transfer controller. The congestion detector detects congestion on the network. The first transfer controller starts a first type of data transfer using an amount of the network and decreases the amount of the network used by the first type of data transfer in accordance with congestion detected by the congestion detector. The resource monitor monitors the first type of data transfer so as to calculate the amount of the network used by the first type of data transfer. The allocation unit determines an amount of the network to be used by a succeeding second type of data transfer in accordance with the amount of the network used by the first data transfer. The second transfer controller starts the succeeding second type of data transfer using the amount of the network determined by the allocation unit.

According to the data transfer apparatus, by monitoring the first type of data transfer (e.g., congestion recovery-type data transfer), the amount of the network used by the first type of data transfer is used to determine the amount of the network to be used by the second type of data transfer. Accordingly, two types of data transfers can be performed simultaneously in a network.

Another aspect of the present invention is to provide a method for performing data transfers between a plurality of computers connected with each other by a network. The method comprises the following steps. Congestion on the network is detected. Data transfers among computers are performed by controlling an amount of the network used by the data transfers in accordance with the detection of congestion. The amount of the network used by the data transfers is monitored on the path where the data transfers converge. An additional data transfer is performed by using an amount of the network determined in accordance with the amount of the network that was monitored.

According to the data transfer method, the amount of the network used by the data transfer that is controlled according to the detection of congestion is monitored. The monitored amount of the network is used to allocate a certain amount of the network to a succeeding data transfer. As a result, two types of congestion control methods (congestion avoidance control and congestion recovery control) can coexist in a network.

This invention can be realized as a computer program product. That is, the computer program can be encoded on a carrier wave that can be transmitted (e.g., over a network) or stored on a recording medium such as, e.g., a CD ROM.

BRIEF DESCRIPTION OF THE DRAWINGS

The invention will be described in conjunction with the following drawings in which like reference numerals designate like elements and wherein:

FIG. 13 shows a data transfer management table of the first embodiment.

FIG. 14 shows a bandwidth statistics table of the first embodiment.

FIG. 28 is a diagram explaining connection and protocol designation according to conventional art TCP/IP.

FIG. 29 shows a protocol information table of the second embodiment.

FIG. 30 shows a data transfer management table of the second embodiment.

DETAILED DESCRIPTION OF PREFERRED EMBODIMENTS

High transmission efficiency can be achieved by using two types of congestion control methods on a single network appropriately according to applications or the amount of requested data to be transferred. For example,

[1] A conventional application performs data transfer by using the recovery-type congestion control.

[2] An application that transfers a large amount of processed result data by using broad bandwidth performs data transfer by the avoidance-type congestion control.

Under this circumstance, both the data transfer controlled by the recovery-type congestion control (congestion recovery-type data transfer) and the data transfer controlled by the avoidance-type congestion control (congestion avoidance-type data transfer) may flow in a transmission path at the same time. In this case, both use the same network resource on the transmission path. The congestion state should be controlled when two types of the congestion control methods simultaneously control a network resource, as well as when one of the congestion control methods controls a network resource.

However, practically speaking, when the two types of congestion control methods control congestion on a network resource simultaneously, the congestion control can break down and the transmission efficiency can become extremely decreased.

Figure 1:
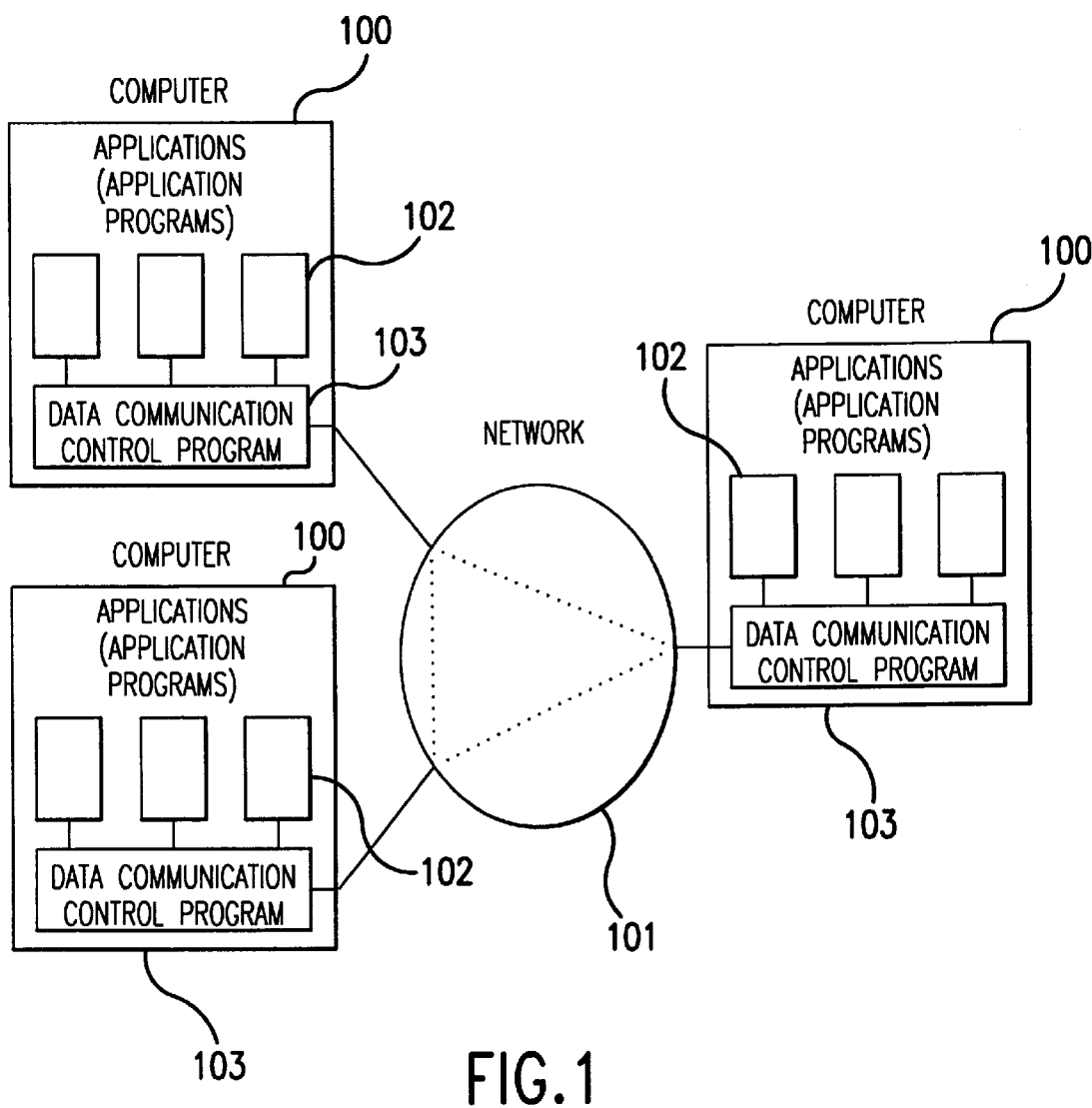
FIG. 1 is a block diagram illustrating a schematic configuration of a computer network.
Figure 2:
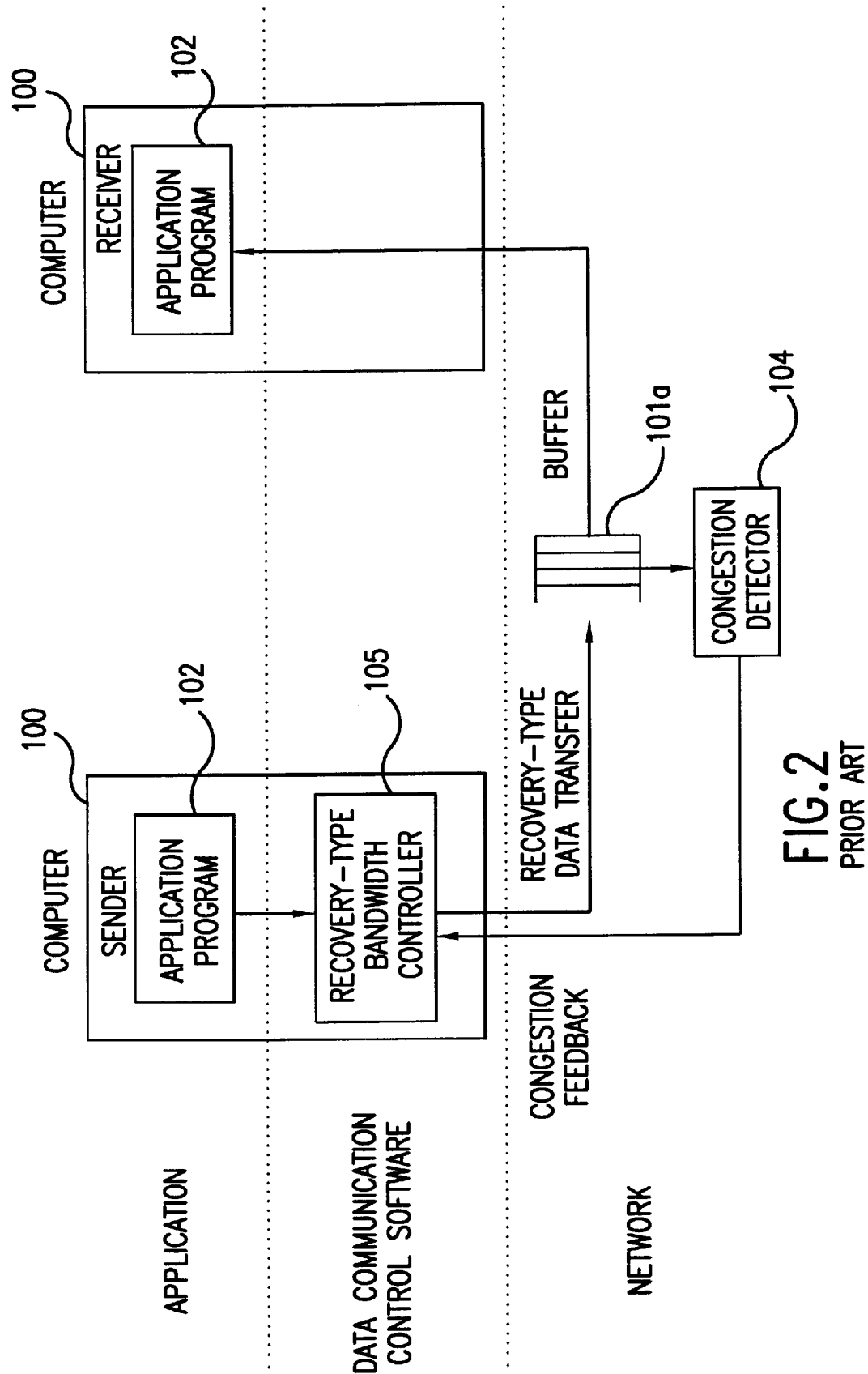
FIG. 2 is a block diagram illustrating a schematic configuration of a conventional data transfer apparatus using recovery-type control.
Figure 3:
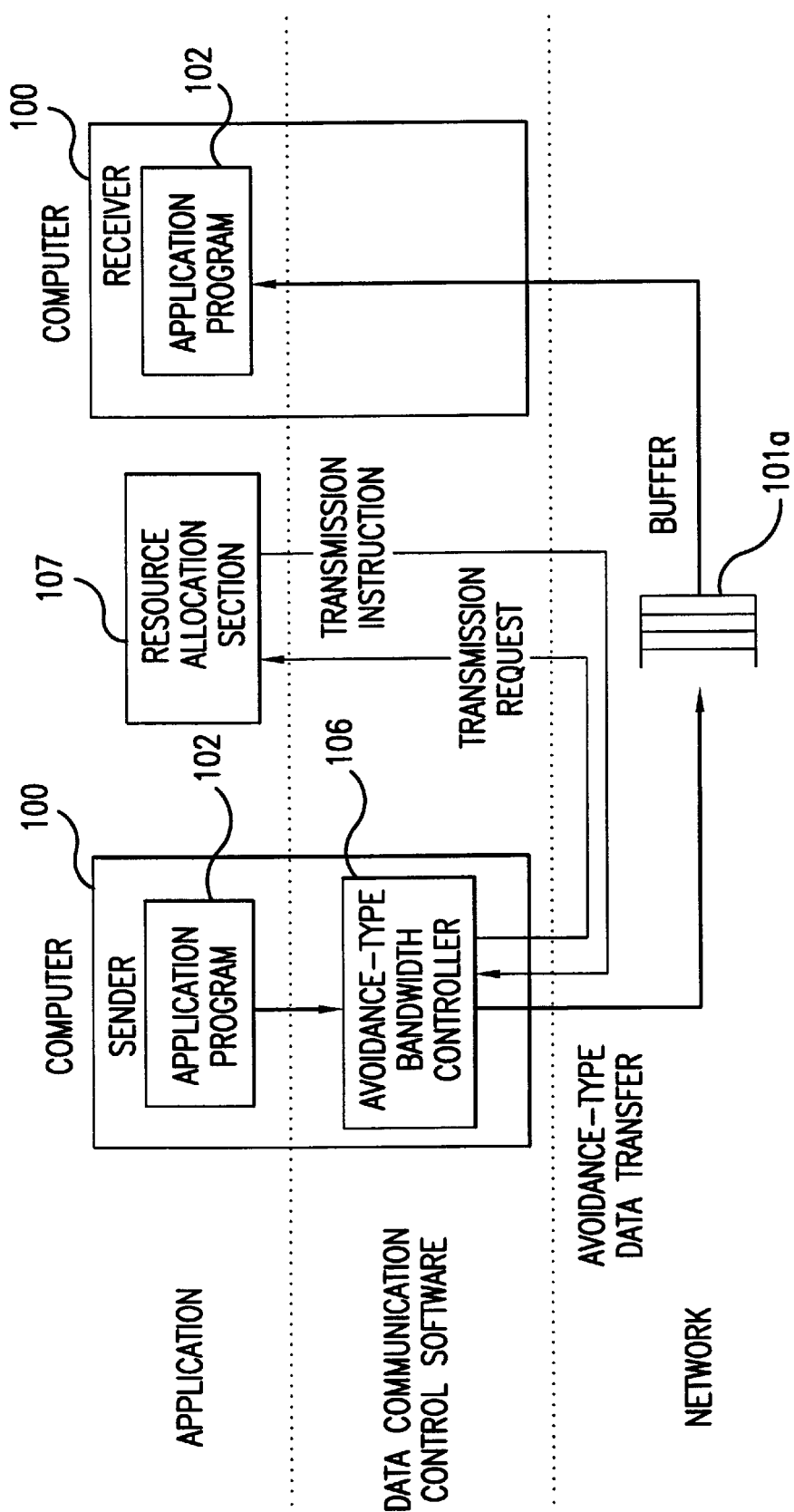
FIG. 3 is a block diagram illustrating a data transfer apparatus using avoidance control.
Figure 4:
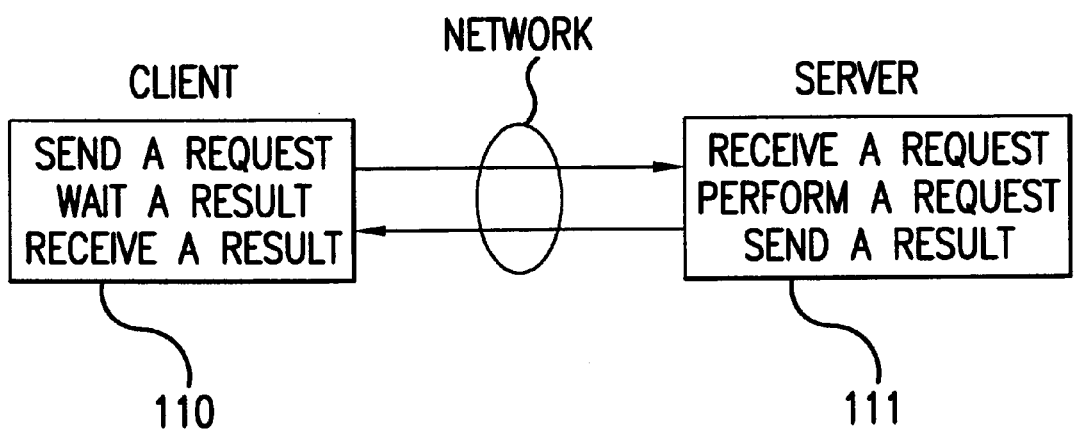
FIG. 4 shows a schematic diagram of a client-server model.

The following example of a client-server model data transfer apparatus explains this problem. First, a client-server model data transfer apparatus is explained. The client-server model is a model that indicates communication between a client 110 (beneficiary of a service) and a server 111 (provider of a service). FIG. 4 shows the concept of the client-server model. In the client-server model data transfer apparatus, data transfers from plural clients 110 come to the server 111 simultaneously.

Figure 5:
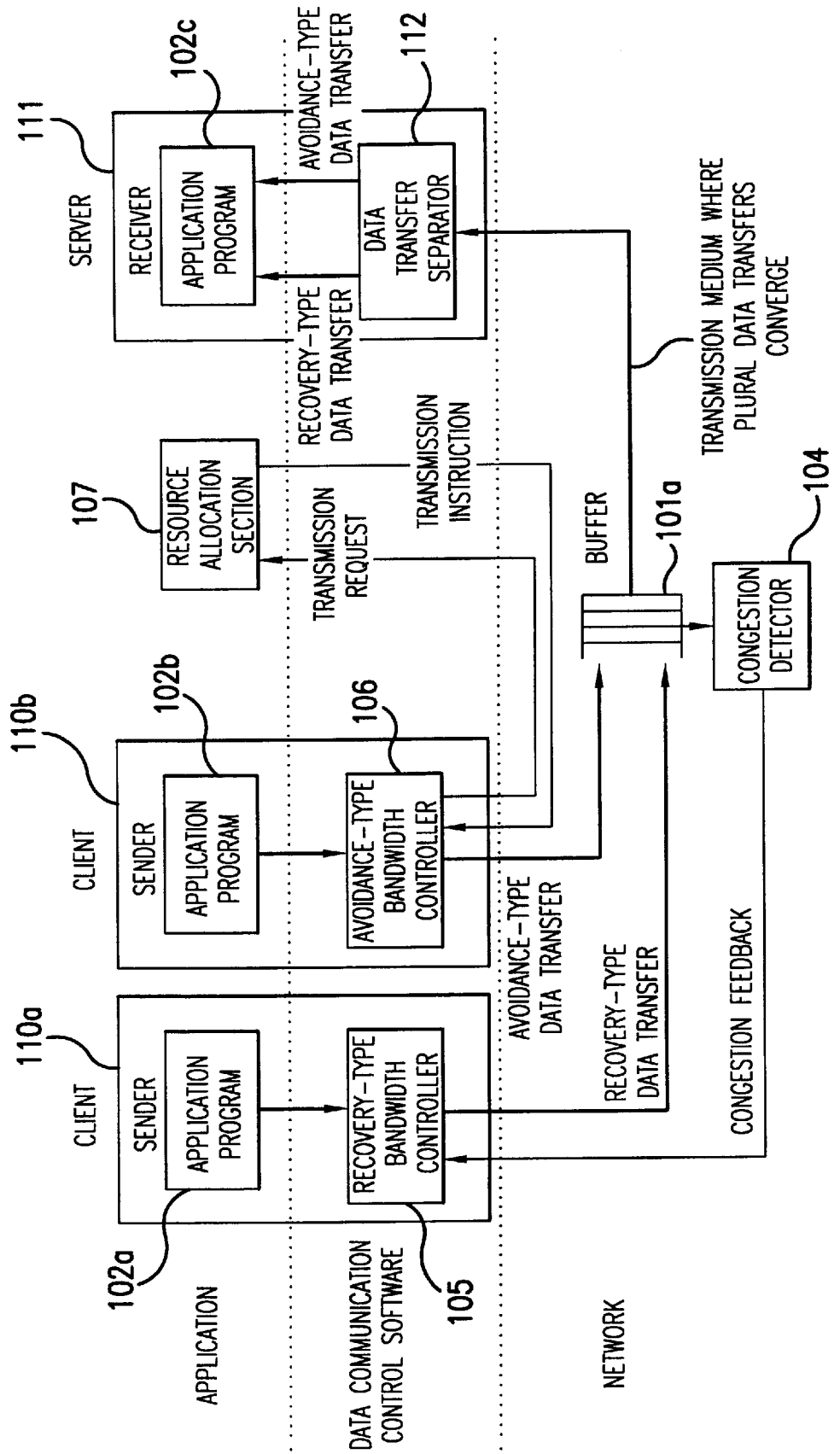
FIG. 5 is a block diagram illustrating a client-server model data transfer apparatus.

FIG. 5 shows a configuration of a client-server model data transfer apparatus that includes two types of the congestion control methods. In the figure, application (program) 102a in client 110a performs a congestion recovery-type data transfer. Application 102b in client 110b performs a congestion avoidance-type data transfer. Both the congestion avoidance-type data transfer and the congestion recovery-type data transfer converge into the transmission path at the entrance of the server 111 and are mixed. Data transfer separator 112 receives the two types of data transfers, separates them and sends them to application 102c on server 111.

The transmission medium at the entrance of the server 111 is sometimes overloaded. In other words, the sum of the bandwidth requested by the congestion avoidance-type data transfer and the bandwidth requested by the congestion recovery-type data transfer exceeds the capacity of the transmission medium. The data corresponding to the difference between the requested bandwidth and the capacity of the transmission medium temporarily stays in buffer 101a. However, the capacity of buffer 101a is limited. When the overload state continues, the buffer overflows. The overflowed data is lost. Thus, congestion occurs.

When congestion occurs, congestion detector 104 detects the congestion and informs recovery-type bandwidth controller 105 of the occurrence of the congestion. Then, recovery-type bandwidth controller 105 decreases the transmission rate.

Meanwhile, regardless of the congestion state, avoidance-type bandwidth controller 106 continues the data transfer at the transmission rate set at the beginning of the data transfer. Moreover, resource allocation section 107 is not aware of the bandwidth used by data transfers made using the recovery-type congestion control.

To summarize, the following are reasons why the problems described above occur when the recovery-type congestion control and the avoidance-type congestion control are simply combined on a network.

(1) Recovery-type congestion control shares a network resource by decreasing the amount of the resource it uses after receiving a feedback of a congestion state. However, avoidance-type congestion control continues to use the amount of the network resource previously allocated in spite of the occurrence of the congestion state. Since this violates the principle of the recovery-type congestion control, the recovery-type congestion control breaks down.

(2) Avoidance-type congestion control establishes a transmission path by allocating a certain amount of the network resources to a data transfer according to the amount of the requested network resource and the amount of unused network resource. However, the recovery-type congestion control starts a data transfer at any time without reporting the amount of the requested network resource. Therefore, avoidance-type congestion control cannot know the exact amount of unused resource. Since this violates the principle of the avoidance-type congestion control, the avoidance-type congestion control breaks down.

There are the following two simple methods so that both the recovery-type congestion control and the avoidance-type congestion control, which basically do not coexist, perform data transfer in a network resource.

The first method divides the network resource into plural parts and uses different congestion control methods for the plural parts, respectively. There are two methods that divide a network resource.

(1) Physical division (e.g., space division or frequency division of a wireless transmission medium)

(2) Logical division (e.g., transmission medium bandwidth reservation such as ATM PVC-CBR, ATM Forum TM Specification Version 4.0 or ATM Forum ATM UNI specification Version 3.1)

In the case of division of the network resource, since both of the congestion control methods are independent, congestion states can be controlled. However, each part of the network resource is always reserved for one of the congestion control methods, even if there is no data transfer thereon. Therefore, the utilization ratio of the network is low.

The second method prepares beforehand enough network resource to allow all data transfer apparatus that share a network to transmit maximum data simultaneously. For example, a broadband transmission medium is prepared. In this case, congestion does not occur. However, the load of the network is very low in the ordinary use. Accordingly, the utilization ratio is low.

Both methods have a problem of low utilization efficiency, and require reconfiguration of the network every time when a new application is installed.

In the congestion control data transfer apparatus of the present invention, data transfer between plural clients and a server is performed through a network, preferably without dividing the network or increasing its size (total bandwidth). A method of the present invention that allows two types of congestion control to coexist is explained below.

The avoidance-type congestion control and the recovery-type congestion control employed in the apparatus of the present invention execute the following procedure in connection with applications.

When receiving a request of a data transfer from an application, the avoidance-type congestion control allocates a certain amount of bandwidth to the data transfer within the unused bandwidth of the transmission medium.

When receiving a request of a data transfer from an application, the recovery-type congestion control does not request a bandwidth for the data transfer. Therefore, the bandwidth for the congestion avoidance-type data transfer is determined according to the estimated bandwidth used by the congestion recovery-type data transfer The bandwidth used by the congestion recovery-type data transfer is estimated according to the parameters of the application on the receiver-side of the transmission request (referred to as a receiver application).

Each receiver application has the following three parameters.

Type of application

Amount of data to be transferred

Type of computer that executes sender application

The type of computer is used to estimate a rough bandwidth (transmission rate) of the sender application. The bandwidth is estimated by using a representative value W0 and time variation of the used bandwidth. The representative value W0 is determined by taking an average over a long time for the used bandwidth. For example, the representative value W0 is classified into the following categories.

Low rate: W0=1 Mbps (e.g., remote procedure call)

Medium rate: W0=10 Mbps (e.g., mail, tool service)

High rate: W0=25 Mbps (e.g., file transfer, print of document mainly including characters)

If either of the following two conditions is satisfied, only the representative value (W0) is estimated and the estimation process then terminates. Otherwise, a time variation as well as the representative value is estimated. It is determined whether the condition is satisfied when the system configuration is determined. The two conditions are:

The sending station limits a maximum transmission rate (shaping).

The sender application performs data transfer by using a fixed bandwidth.

As described above, the estimation procedure consists of two phases, i.e., phase 1 (estimation of a representative value) and phase 2 (estimation of a time variation). Phase 1 estimates a representative value of the bandwidth used by the congestion recovery-type data transfer executed by a receiver application based on the parameters held by the receiver application. When plural recovery-type data transfers are performed, estimated total values are defined as $\Sigma W0$, which is a sum of the representative values W0, and $\Sigma W(t)$, which is a sum of the time variations.

Figure 6:
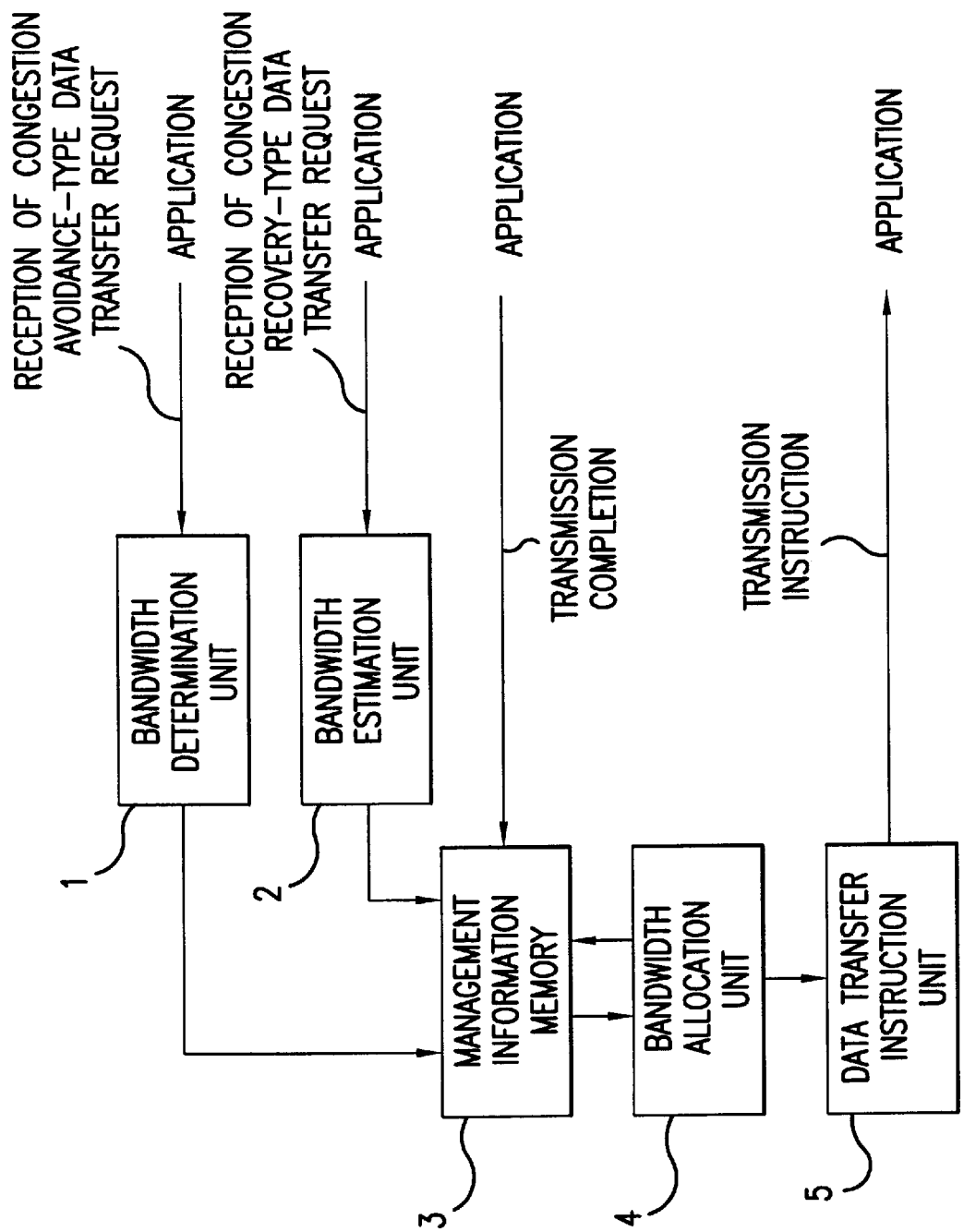
FIG. 6 is a schematic configuration of an embodiment of the present invention.

To execute the procedure described above, the congestion control data transfer apparatus of the present invention is made of the following five units. FIG. 6 shows a block diagram illustrating a configuration of the present invention.

(1) Bandwidth determination unit 1

Bandwidth determination unit 1 determines a bandwidth to be used by the congestion avoidance-type data transfer based on control information communicated between applications prior to the data transfer. The control information includes the amount of data to be transferred, a request of transmission time, or the like.

(2) Bandwidth estimation unit 2

Bandwidth estimation unit 2 estimates a bandwidth used by the congestion recovery-type data transfer based on control information communicated between applications prior to the data transfer. The control information includes the amount of data to be transferred, a type of the computer that executes a sender application, or the like.

Figure 7:
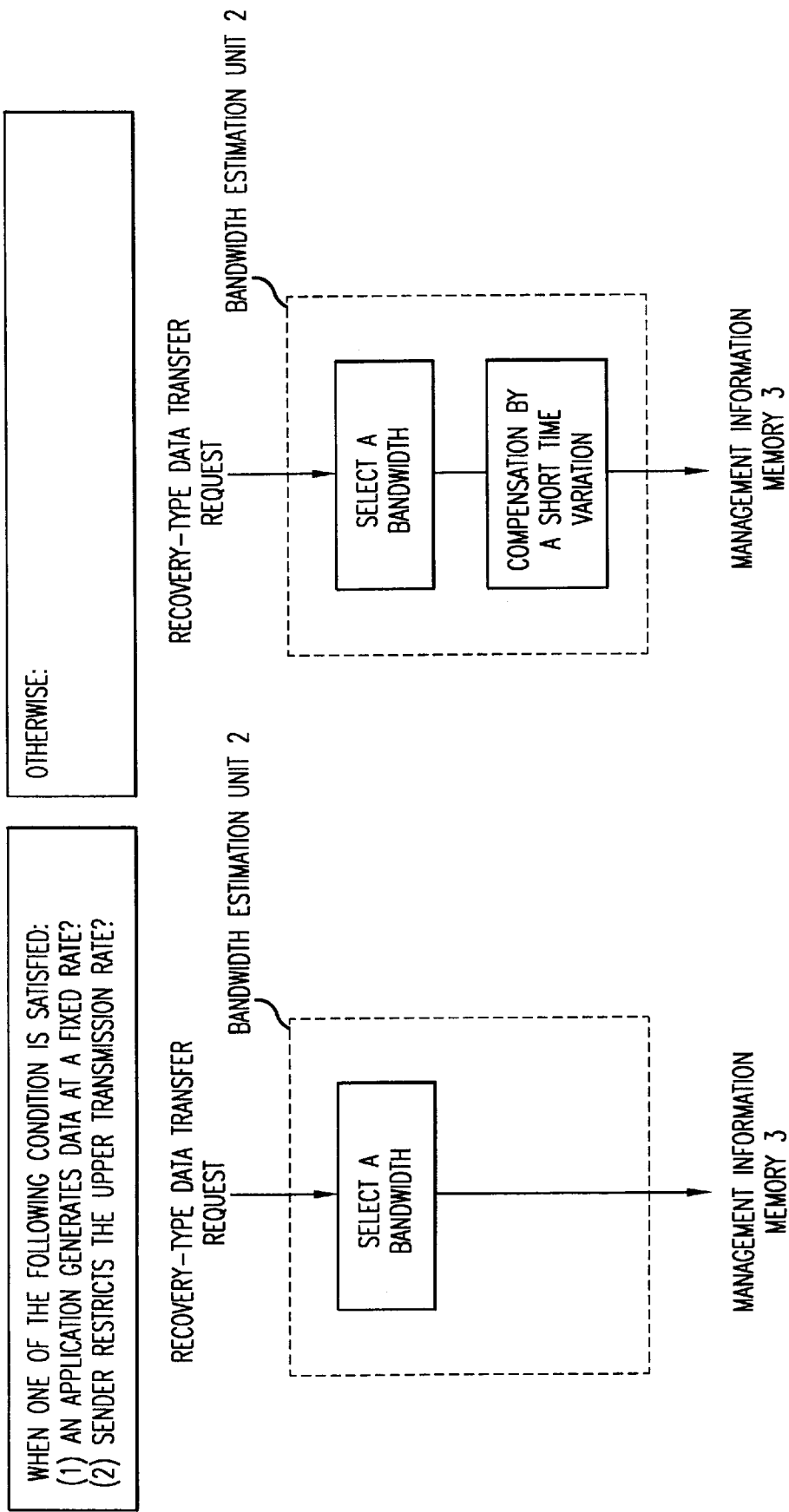
FIG. 7 shows a bandwidth estimation unit of an embodiment of the present invention.

FIG. 7 shows estimation of a bandwidth. The estimation procedure of a bandwidth has the following two phases.

Phase 1: Selection of a representative value (W0) of a bandwidth

Phase 2: Compensation by a short time variation (3) Management information memory 3

Management information memory 3 stores management information for both congestion avoidance-type data transfers and congestion recovery-type data transfers that are using the transmission medium at this moment (i.e., simultaneously). The management information includes the bandwidth being used by each data transfer.

(4) Bandwidth allocation unit 4

Bandwidth allocation unit 4 determines whether a requested congestion avoidance-type data transfer can be executed based on the amount of unused bandwidth of the transmission medium and the bandwidth to be used by the new data transfer requested by an application. Bandwidth allocation unit 4 also allocates a bandwidth to the congestion avoidance-type data transfer of the new request.

Figure 8:
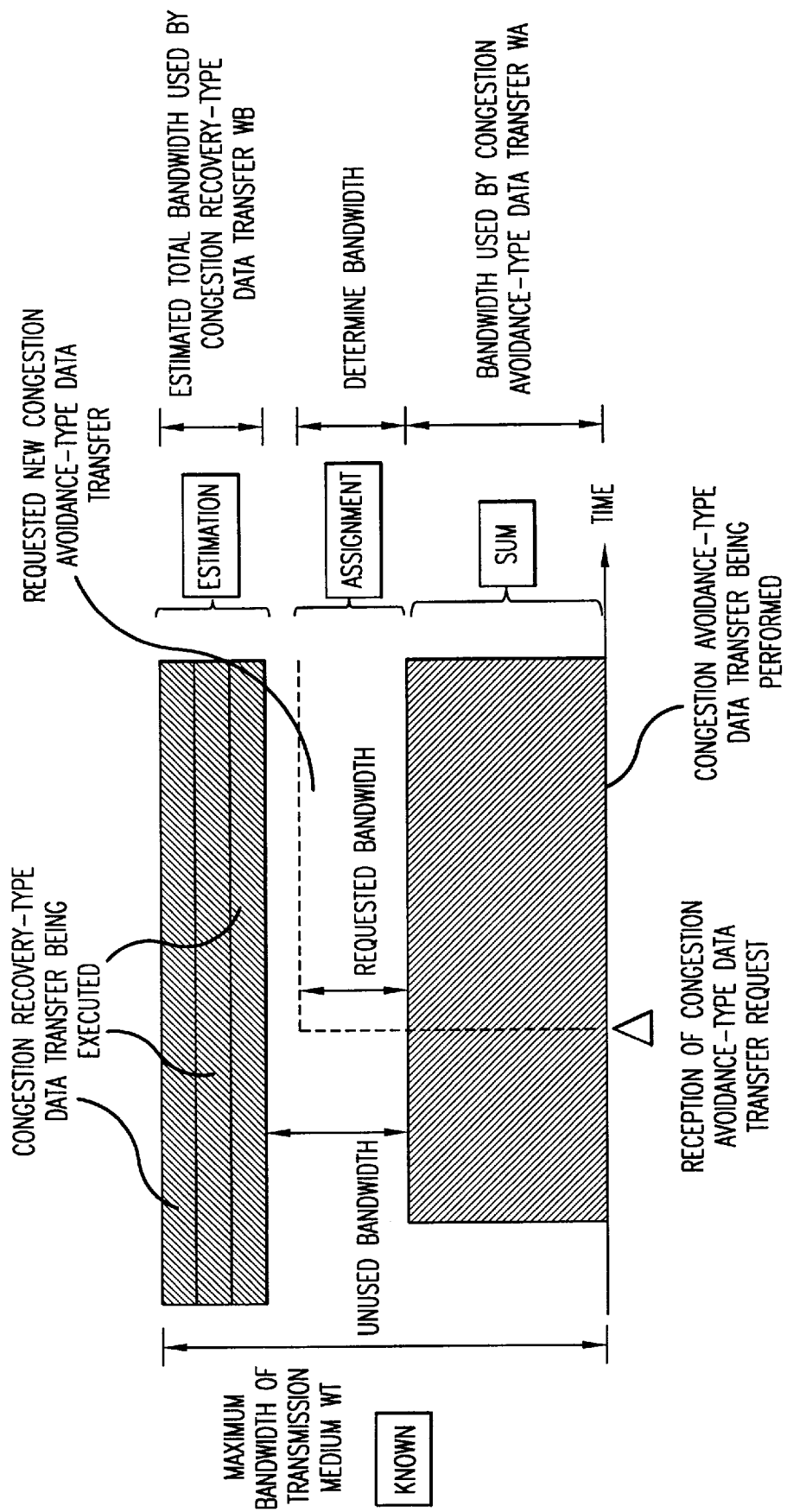
FIG. 8 is a schematic diagram explaining a method for allocating a bandwidth of an embodiment of the present invention.

FIG. 8 schematically shows a method for allocating a bandwidth. The unused bandwidth of the transmission medium is calculated by subtracting WA and WB from WT. Here, WA is the total bandwidth being used by all the congestion avoidance-type data transfers recorded in management information memory 3. WB is the total estimated bandwidth used by all the recovery-type data transfers recorded in management information memory 3. WT is the known capacity of the transmission medium.

(5) Data transfer instruction unit 5

Data transfer instruction unit 5 instructs an application to send data corresponding to the new request of data transfer. If the data transfer of the new request is the congestion avoidance-type data transfer, the transmission instruction includes a bandwidth allocated by the bandwidth allocation unit 4. If there is no available bandwidth, data transfer instruction unit 5 does not send a transmission signal to the application requesting a congestion avoidance-type data transfer. Accordingly, the application will wait to receive the transmission signal. On the other hand, congestion recovery-type data transfers occur automatically, that is, regardless of the availability of bandwidth. If congestion occurs, the congestion recovery-type data transfers that are taking place will reduce the amount of the bandwidth they are using by, for example, reducing their transmission rates.

Figure 9:
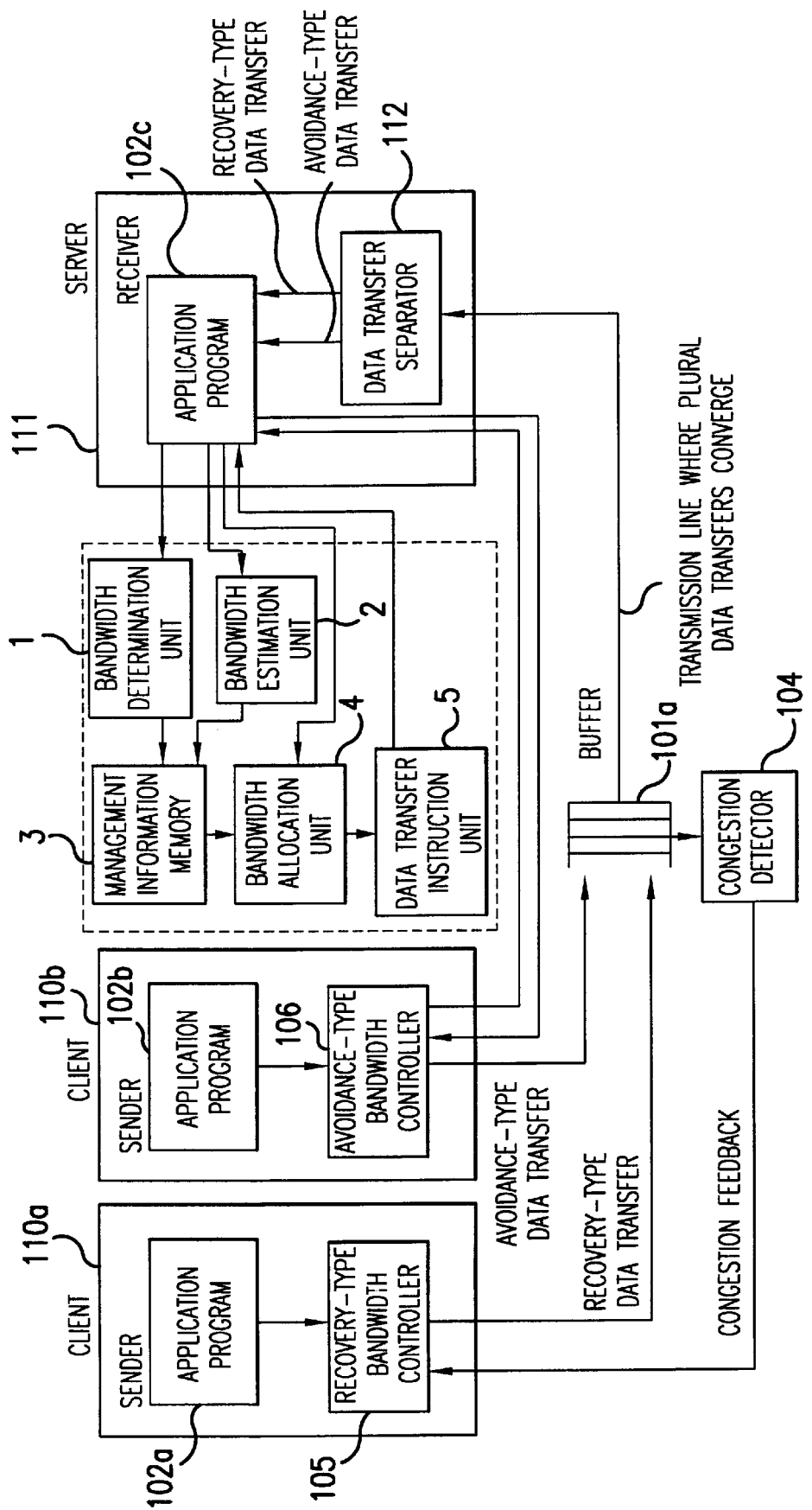
FIG. 9 is a block diagram illustrating an embodiment of the present invention.

FIG. 9 is a block diagram illustrating a detailed configuration of an embodiment of the present invention using the basic concepts described above. In FIG. 9, units corresponding to those in FIG. 5 or FIG. 6 have the corresponding reference numbers. First, it is explained where the data transfer apparatus of the present invention is provided.

The congestion control data transfer apparatus of the present invention is located between a data transfer control program and an application on the computer (e.g., a server) where both congestion avoidance-type data transfers and congestion recovery-type data transfers come simultaneously, and therefore congestion may occur. In other words, it is the place on a network where data transfer requests converge.

In a client-server model application, data transfers from many clients are concentrated (converge) on a server. In this case, on a switch-type network, both congestion recovery-type data transfers and congestion avoidance-type data transfers converge into the transmission medium that connects a server and a network. Therefore, all data transfers that converge into the transmission medium can be monitored at a connection port that is an end of the transmission medium, or at an entrance of the server that is another end of the transmission medium.

As described above, points where data transfers converge and congestion occurs exist locally and can be designed beforehand. Therefore, the data transfer apparatus of the present invention can be located at these points.

In FIG. 9, when client 110a performs a congestion recovery-type data transfer to server 111, bandwidth estimation unit 2 monitors the data transfer and estimates the amount of used resource. The estimated amount of used resource is stored into management information memory 3. Meanwhile, prior to a congestion avoidance-type data transfer from client 110b to server 111, avoidance-type bandwidth controller 106 sends a request of a congestion avoidance-type data transfer. Bandwidth determination unit 1 determines a requested bandwidth based on the requested congestion avoidance-type data transfer. Bandwidth allocation unit 4 accesses management information memory 3 in order to retrieve an estimated amount of the resource being used by congestion recovery-type data transfers, and of the resource being used by the other congestion avoidance-type data transfers. According to this information, bandwidth allocation unit 4 allocates a bandwidth to the requested congestion avoidance-type data transfer. Data transfer instruction unit 5 sends a transmission instruction to avoidance-type bandwidth controller 106 and reports the allocated resource.

As described above, congestion recovery-type data transfer and congestion avoidance-type data transfer can coexist.

Next, an embodiment of the present invention is explained with reference to a data transfer apparatus of a client-server model application. In this embodiment, a monitoring point of data transfers is provided at the entrance of a server, which is an end of the transmission medium that connects a network with the server.

Figure 10:
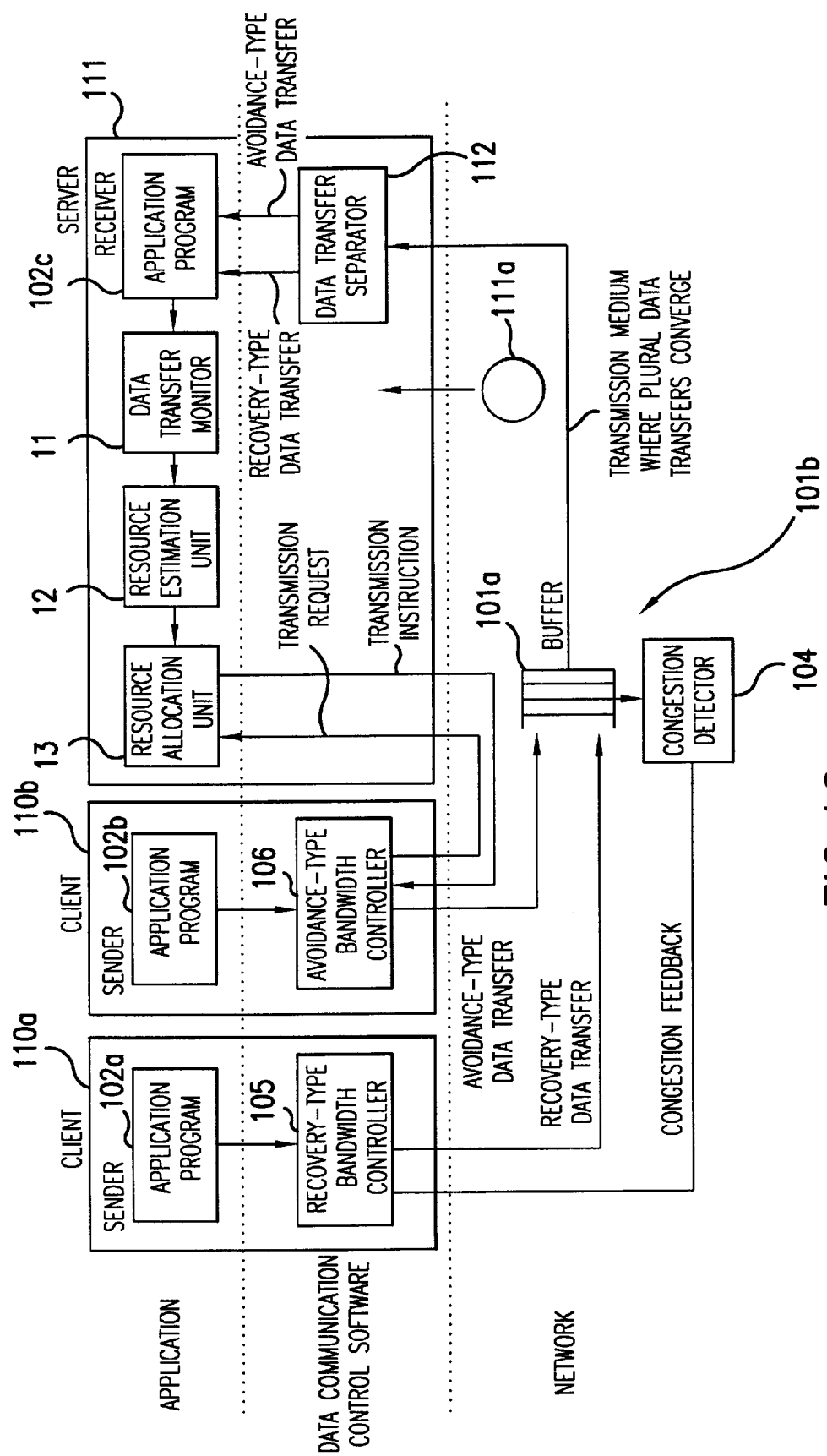
FIG. 10 is a block diagram illustrating the configuration of a first embodiment.

FIG. 10 is a block diagram illustrating the configuration of the data transfer apparatus of the first embodiment. In this figure, clients 110a and 110b perform data transfer to server 111. In other words, clients 110a and 110b are sending stations, and server 111 is a receiving station. The data transfer apparatus includes client 110a, client 110b, data transfer separator 112, data transfer monitor 11, resource estimation unit 12, server 111 and packet switch 101b. Packet switch 101b connects the units described above with each other and performs data transfer by using packets, and includes congestion detector 104 and buffer 101a. Client 110a includes recovery-type bandwidth controller 105. Client 110b includes avoidance-type bandwidth controller 106. Server 111 also includes resource allocation unit 13.

Application 102c on server 111 sends a reception start signal to data transfer detection function 14 (FIG. 11) in data transfer monitor 11, when receiving a congestion recovery-type data transfer. Application 102c also sends a reception completion signal to data transfer detection function 14 in data transfer monitor 11, when the data transfer is completed.

Recovery-type bandwidth controller 105 and congestion detector 104 are the same as those of the conventional art, ABR. Avoidance-type bandwidth controller 106 is the same as the data transfer apparatus disclosed in Japanese Laid-Open Patent Application Ser. No. 9-214555 (and its corresponding U.S. patent application Ser. No. 08/788,464, still pending), which can control congestion. In short, the data transfer apparatus of 9-214555 knows a transmission state, such as a start time, end time, sending terminal, receiving terminal, path, change of the bandwidth used by each data transfer, or the like, and controls data transfer in a centralized (unified) manner in accordance with the transmission state so as to avoid congestion.

However, this embodiment of the present invention also includes a conventional congestion recovery-type data transfer, and it is impossible to know the transmission states of that kind of data transfer. Therefore, in this embodiment, the amount of the resource used by the congestion recovery-type data transfer is estimated. Then, network resource is allocated to a congestion avoidance-type data transfer based on the estimated value. When receiving a data transfer request from application 102b, avoidance-type bandwidth controller 106 sends a transmission request to resource allocation unit 13.

When receiving a transmission instruction from resource allocation unit 13, avoidance-type bandwidth controller 106 performs data transfer by using the bandwidth included in the transmission instruction. When the data transfer is completed, the avoidance-type bandwidth controller 106 informs resource allocation unit 13 of the completion of the data transfer.

Figure 11:
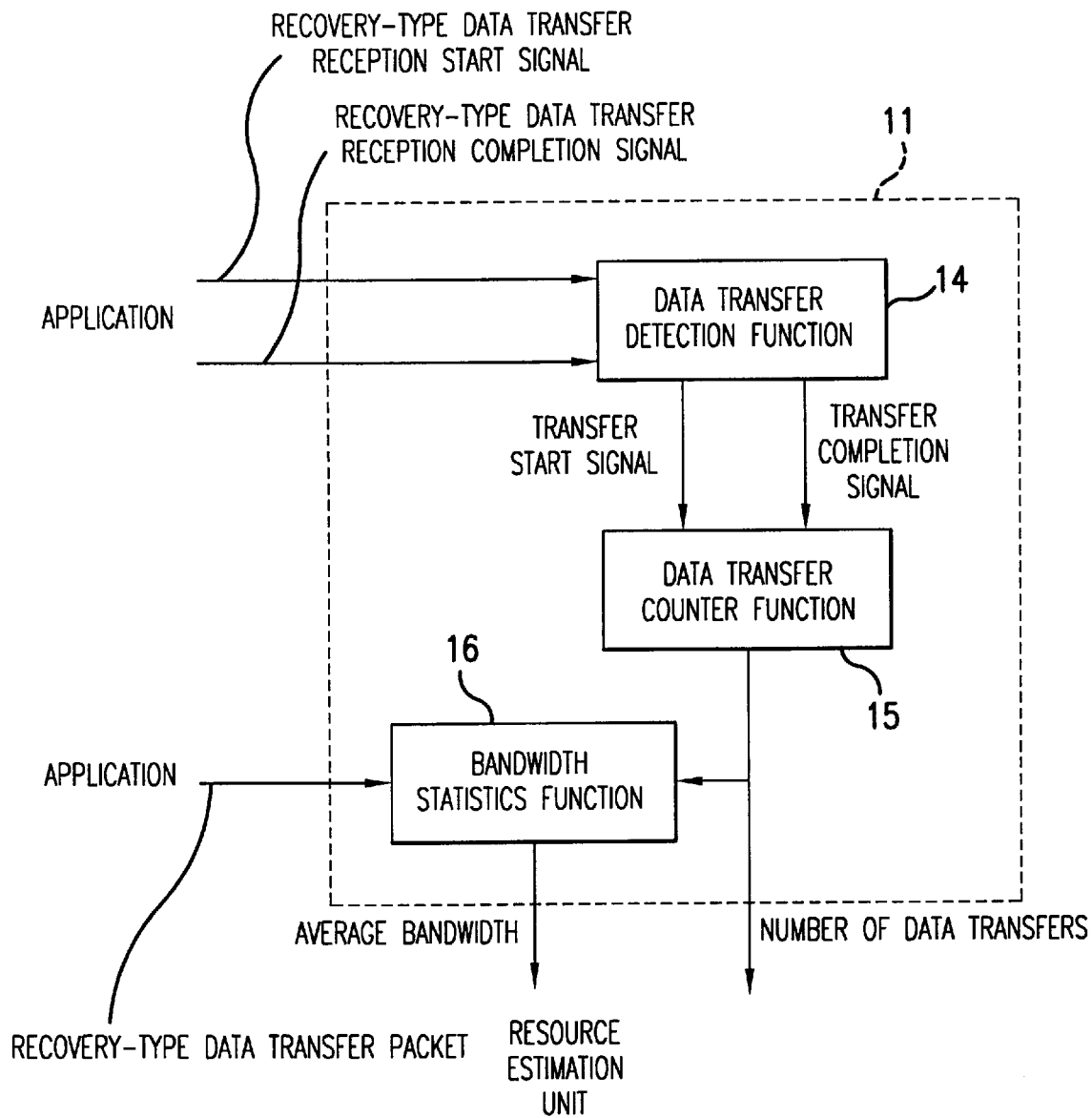
FIG. 11 is a block diagram illustrating the configuration of the data transfer monitor of the first embodiment.
Figure 12:
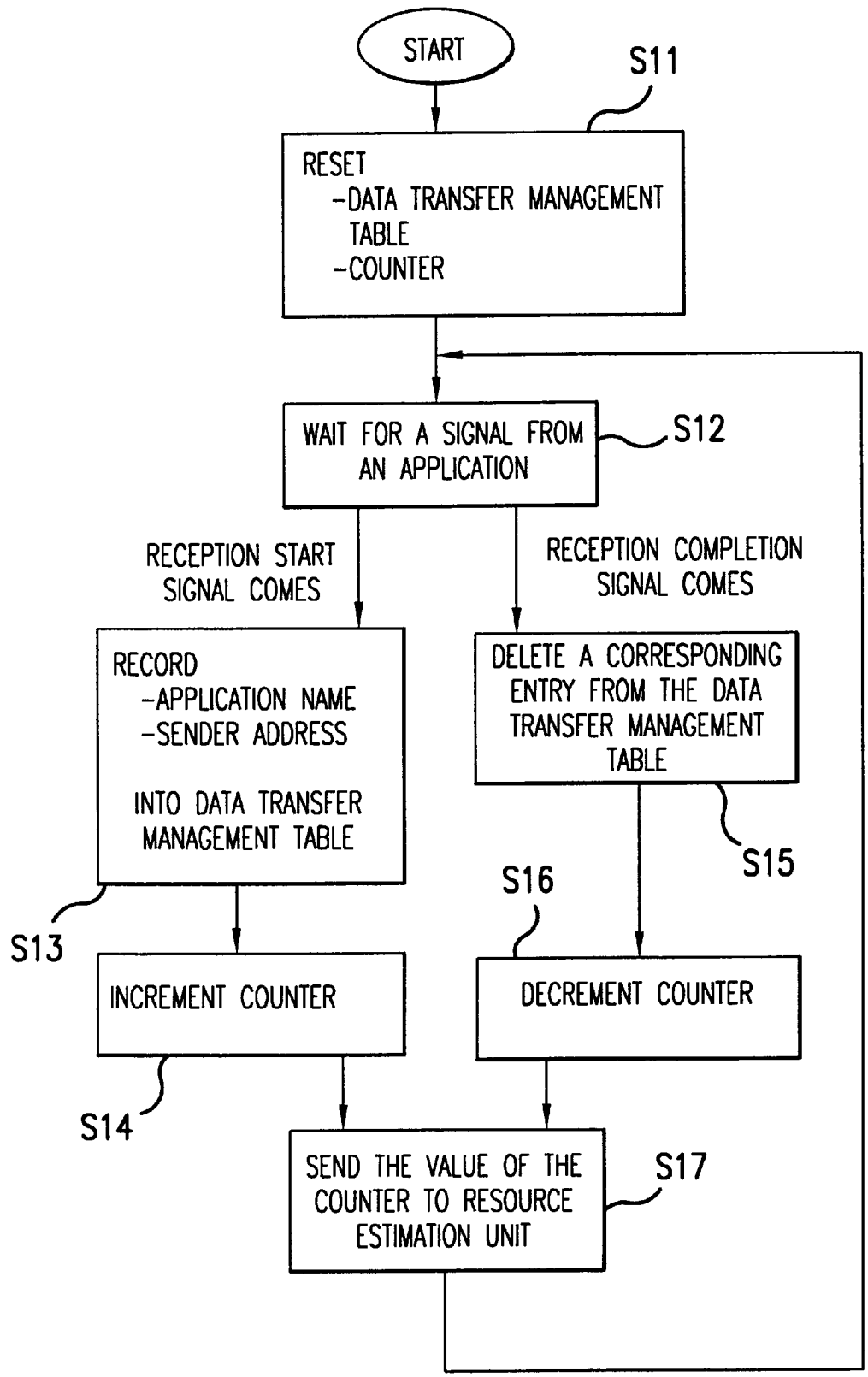
FIG. 12 is a flowchart illustrating a process performed by the data transfer monitor of the first embodiment.

The configuration and process of each unit are explained below. FIG. 11 and FIG. 12 respectively show a configuration and process of data transfer monitor 11.

Data transfer monitor 11 includes the data transfer detection function 14, a data transfer counter function 15 and a bandwidth statistics function 16.

Application (application program) 102c sends a reception start signal to data transfer detection function 14 in data transfer monitor 11 when receiving a congestion recovery-type data transfer. In addition, application 102c sends a reception completion signal to data transfer detection function 14 in data transfer monitor 11, when the data transfer is completed.

At first, data transfer detection function 14 executes an initialization process (step S11). When receiving a reception start signal from application (application program) 102c, data transfer detection function 14 sends a transfer start signal to data transfer counter function 15 and records the data transfer corresponding to the reception start signal into a data transfer management table (steps S12 and S13). The data transfer management table stores entries of data transfers existing at the moment. FIG. 13 shows the structure of the data transfer management table of the first embodiment. Each entry includes an application name and an address of the sending station that starts the data transfer to the server 11.

Data transfer detection function 14 also checks entries of the data transfer management table when a reception completion signal comes from application 102c. If the reception completion signal matches an entry, data transfer detection function 14 sends a transfer completion signal to data transfer counter function 15 and deletes the matched entry from the data transfer management table (steps S12 and S15).

Data transfer counter function 15 includes a counter. When a transfer start signal comes from data transfer detection function 14, the counter is incremented (step S14). When a transfer completion signal is received, the counter is decremented (step S16). Thus, the counter stores the number of data transfers existing at the moment (i.e., simultaneously). Data transfer counter function 15 sends the number of data transfers to bandwidth statistics function 16 and resource estimation unit 12 when the counter value is changed (step S17).

Bandwidth statistics function 16 includes a bandwidth statistics table, a counter and a timer.

The bandwidth statistics table stores a total receiving time and the total number of received packets in association with the number of data transfers. FIG. 14 shows one possible structure thereof.

Bandwidth statistics function 16 resets and restarts the timer when receiving the number of data transfers from data transfer counter function 15. The timer counts the time length of a period in which the number of existing data transfers is not changed. Before the timer is reset, the value of the timer is added to the total receiving time corresponding to the received number of data transfers stored in the bandwidth statistics table.

Bandwidth statistics function 16 increments the counter, when a packet of a congestion recovery-type data transfer is received. Thus, the counter counts the number of received packets. When the timer is reset, bandwidth statistics function 16 adds the value of the counter to the total number of received packets corresponding to the received number of data transfers stored in the bandwidth statistics table, and resets the counter.

When receiving the number of data transfers from data transfer counter function 15, bandwidth statistics function 16 calculates an average bandwidth [bps] corresponding to the received number of data transfers. The average bandwidth is calculated by using the following expression based on the total receiving time and total number of received packets in association with the received number of data transfers by the bandwidth statistics table. Then, the calculated average bandwidth is sent to resource estimation unit 12 as a long time average of the bandwidth.

$$\text{AverageBandwidth[bps]} = \frac{\text{Total Number Of Received Packets} \times \text{FixedPacketLength[bit]}}{\text{TotalReceivingTime [sec]}} \quad (1)$$

It is possible to use a constant previously input by the user through a user interface as a long time average of bandwidth that is used by a single data transfer. Alternatively, network management information can be used.

In addition, it is possible to use a shaping rate, which determines the upper limit of the data transmission rate, instead of the long time average of a bandwidth used by a single data transfer.

Figure 15:
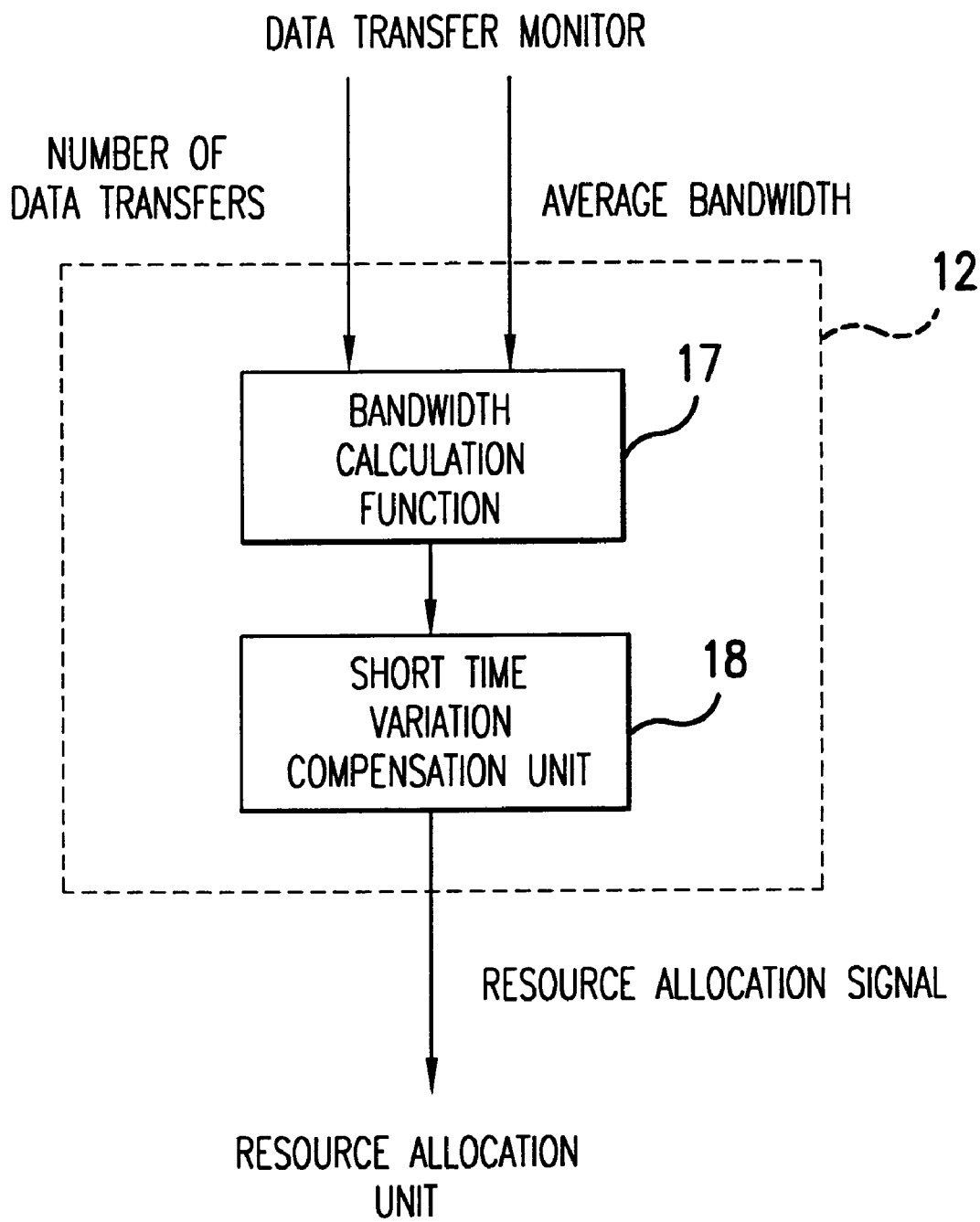
FIG. 15 is a block diagram illustrating the configuration of a resource estimation unit of the first embodiment.
Figure 16:
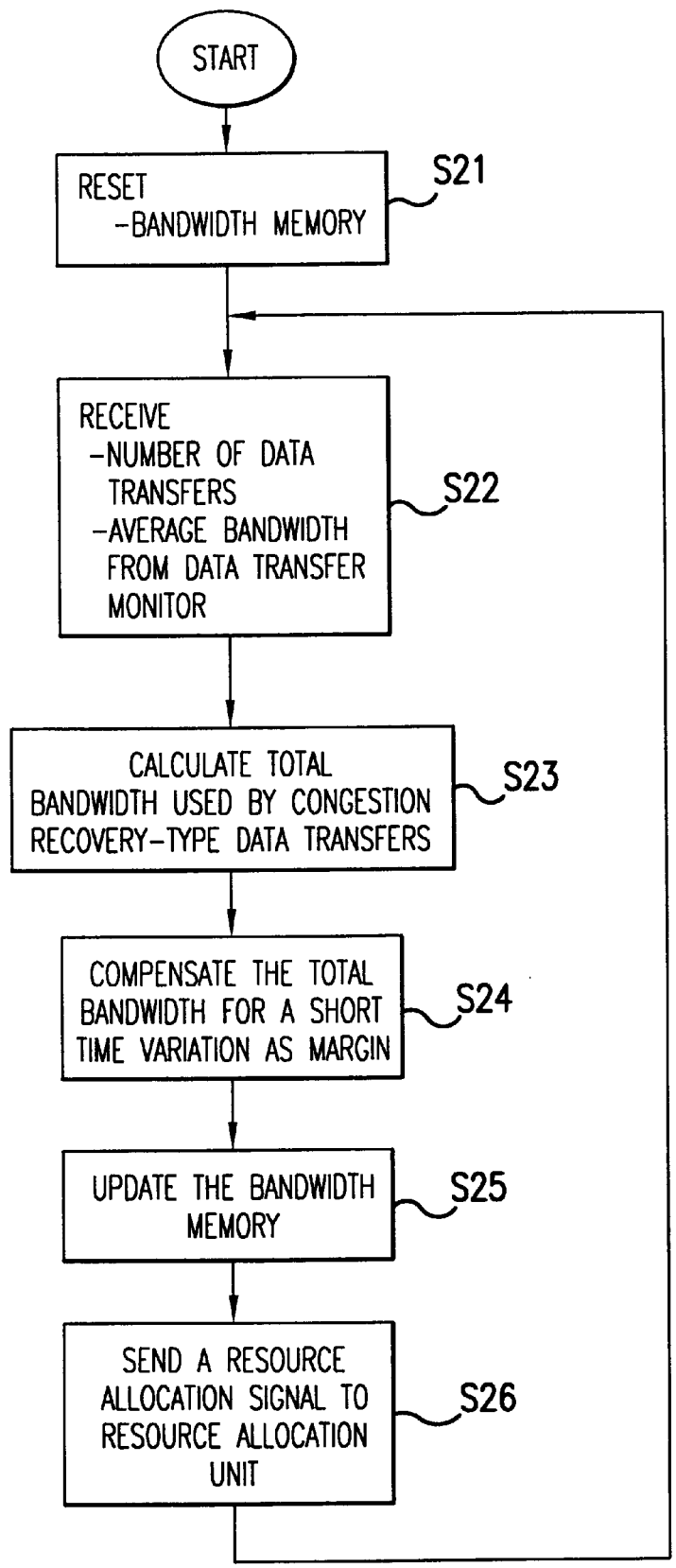
FIG. 16 is a flowchart illustrating a process performed by the resource estimation unit of the first embodiment.

FIG. 15 and FIG. 16 respectively show the configuration and the process of resource estimation unit 12.

Resource estimation unit 12 includes bandwidth calculation function 17 and short time variation compensation function 18.

At first, bandwidth calculation function 17 executes an initialization process (step S21). When N, the number of existing data transfers, and Rave, the long time average of a bandwidth used by a single data transfer, come from data transfer monitor 11, bandwidth calculation function 17 calculates Rused, the total bandwidth used by a congestion recovery-type data transfer according to the following expression (2) (steps S22 and S23).

$$R_{used} = N \times R_{ave} \quad (2)$$

$R_{used}$ : Estimated BandwidthUsedBy CongestionRecovery_typeDataTransfer[bps $R_{ave}$ : LongTimeAverageOfBandwidthUsedby CongestionRecovery_typeDataTransfer[bps $N$ : NumberOfDataTransfers When the estimated Rused comes from bandwidth calculation function 17, short time variation compensation function 18 compensates Rused for a short time variation (step S24).

The compensation method is explained below. The time average of the bandwidth of the data transfer during a measuring period is close to the long time average (statistics average) when the measuring period is sufficiently long. On the other hand, when the measuring period is short, a short time variation makes an error that cannot be ignored. In order to estimate the bandwidth used by congestion recovery-type data transfers during the control cycle time of congestion avoidance control, the control cycle time of the congestion avoidance control shown in the following expression (3) is set as the measuring period.

$$\text{ControlCycleTime } T \text{ [sec]} = \frac{\text{AmountOfRequestedData to be Transfered [bit]}}{\text{Requested Bandwidth [bps]}} \quad (3)$$

The estimated value is determined by adding the short time variation, which is inversely proportional to the length of the control cycle time, to the estimated total bandwidth Rused. Thus, Rused', the estimated bandwidth used by congestion recovery-type data transfers after the compensation, is calculated by using the following expression (4).

$$R'_{used} = R_{used} \times \left(1 + \frac{a}{T}\right) \quad (4)$$

$R'_{used}$: EstimatedBandwidthUsedbyCongestion
Recovery_typeDataTransfer[bps]
(aftercompensation)

$R_{used}$: EstimatedBandwidthUsedbyCongestio:
Recovery_typeDataTransfer[bps]
(beforecompensation)

$a$: CompensationCoefficient $T$: ControlCycleTimeofCongestionAvoidance
Control[sec]

Short time variation compensation function 18 calculates Rused' by compensation, and stores the calculated Rused' into the bandwidth memory (step S25). In addition, short time variation compensation function 18 sends a resource allocation signal to resource allocation unit 13 when the bandwidth memory is updated (step S26).

It is possible to estimate the bandwidth used by congestion recovery-type data transfers based on Rave(i) (i=0, 1, 2, . . . , m; i is an identifier of a sending station) on the condition that each sending station has a unique input-output rate of its memory media. Rave(i) is the long time average of a bandwidth used by a data transfer and is unique for each sending station. In this case, Rused is calculated by using the following expression (5).

$$R'_{used} = \left(1 + \frac{a}{T}\right) \sum_{i=1}^{N} R_{ave}(i) \quad (5)$$

$R'_{used}$: EstimatedBandwidthUsedbyCongestion
Recovery_typeDataTransfer[bps]

$R_{ave}(i)$: LongTimeAverageofBandwidthUsedby
CongestionRecovery_typeDataTransfer[bps]

$N$: NumberOfDataTransfers $a$: CompensationCoefficient $T$: ControlCycleTimeofCongestionAvoidance
Control[sec]

Figure 17:
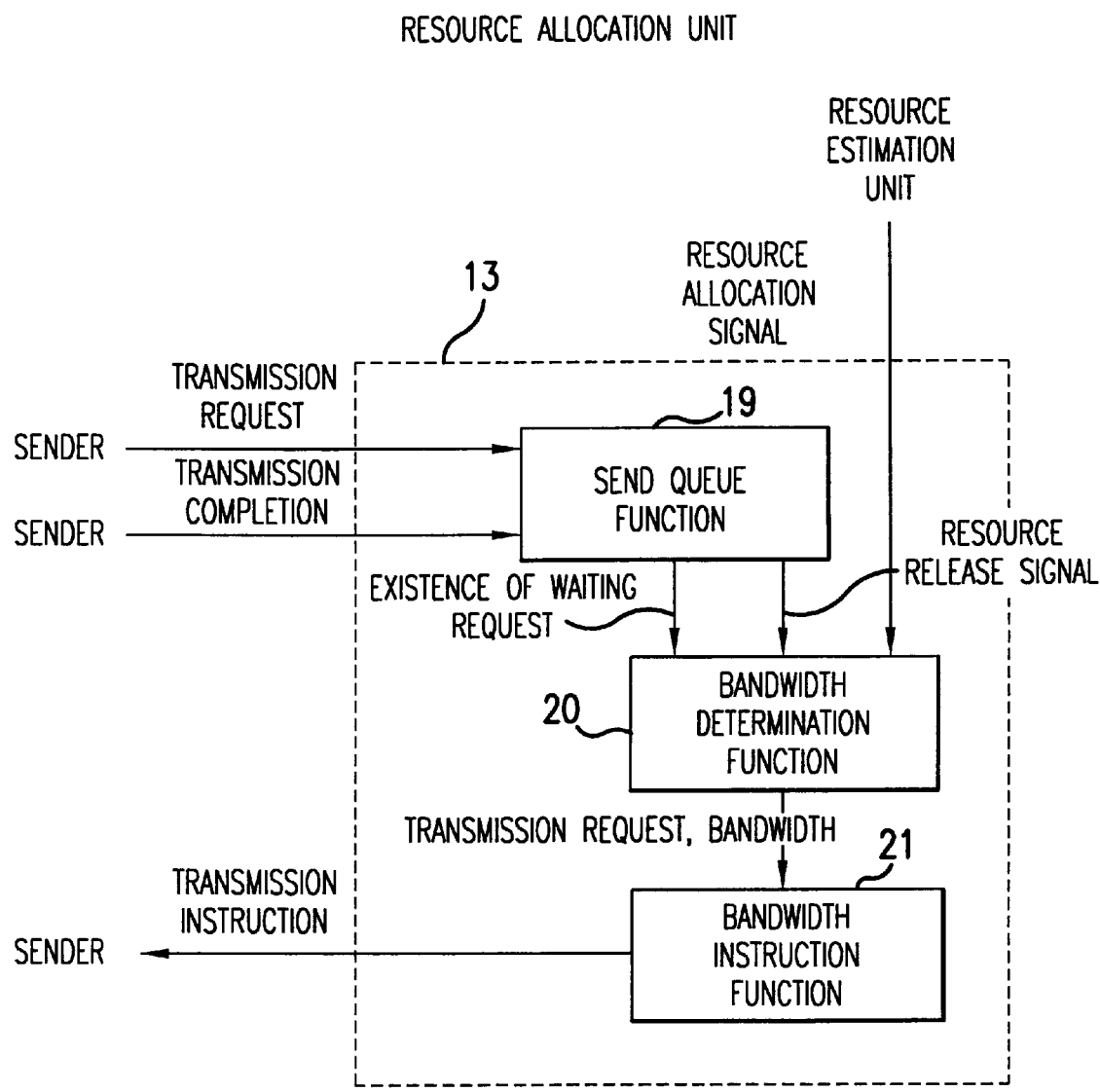
FIG. 17 is a block diagram illustrating the configuration of a resource allocation unit of the first embodiment.
Figure 18:
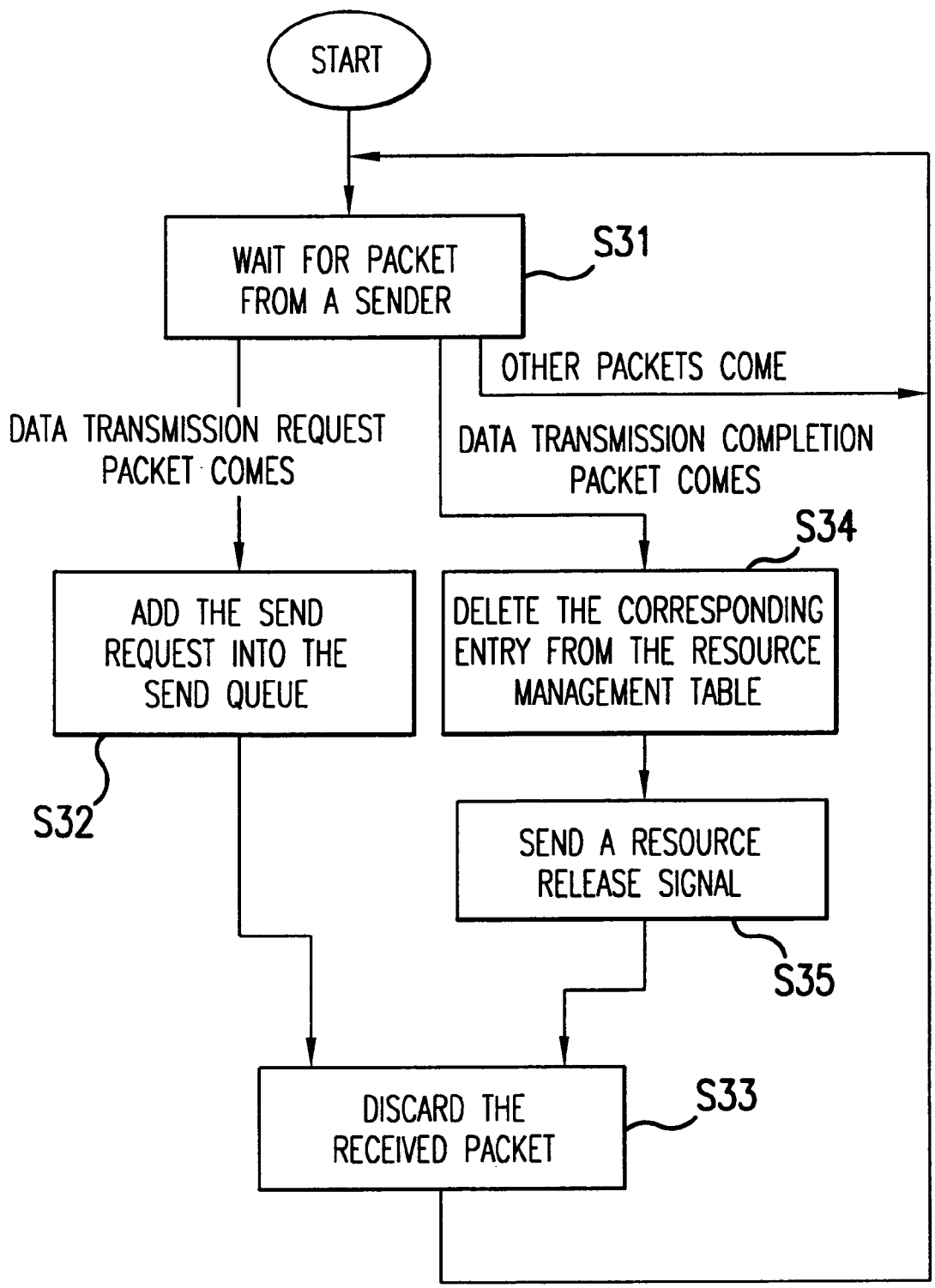
FIG. 18 is a flowchart illustrating a send queue function executed by the resource allocation unit of the first embodiment.
Figure 19:
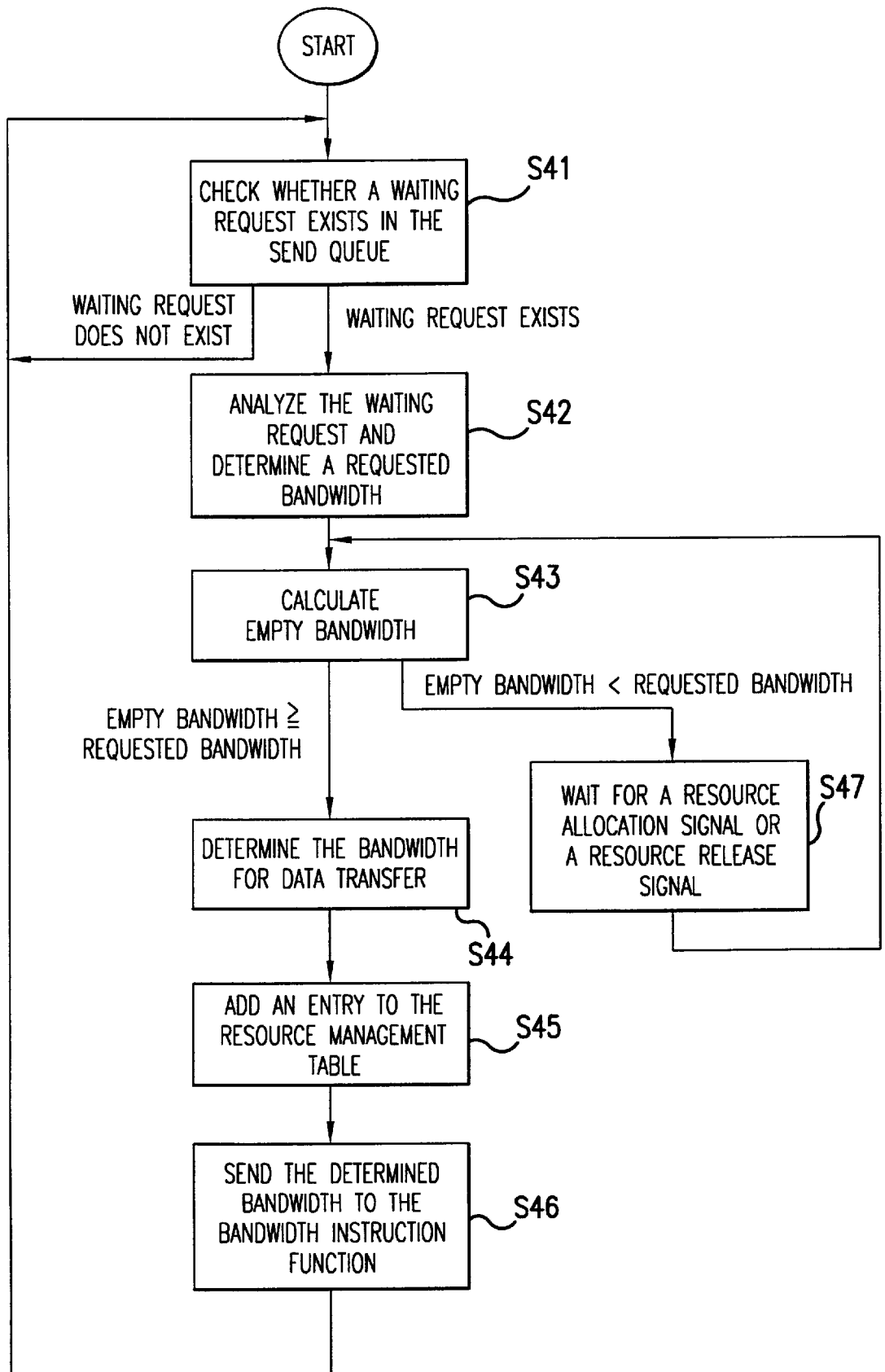
FIG. 19 is a flowchart illustrating a bandwidth determination function executed by the resource allocation unit of the first embodiment.
Figures 20, 21:
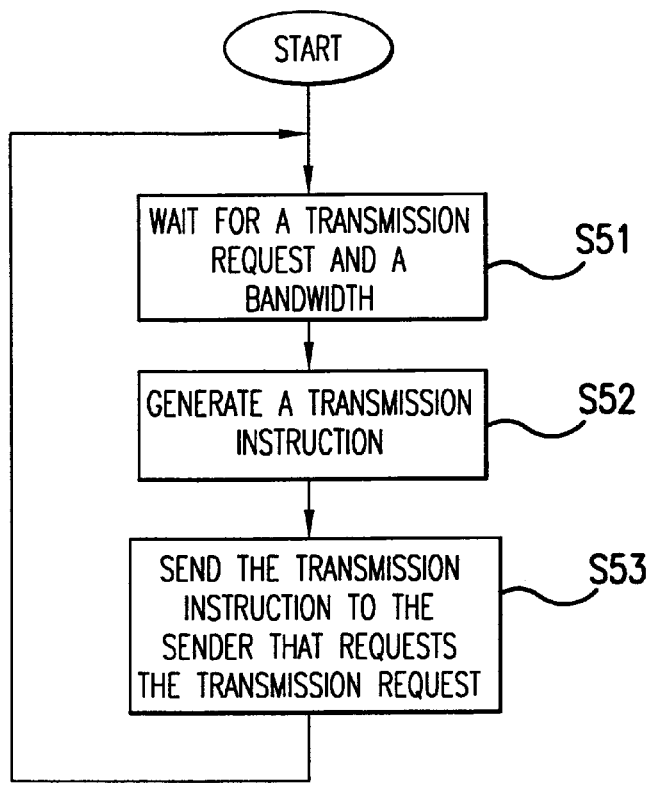
FIG. 20 is a flowchart illustrating a bandwidth instruction function executed by the resource allocation unit of the first embodiment.
FIG. 21 shows a resource management table of the first embodiment.

FIG. 17 shows the configuration of resource allocation unit 13 of the first embodiment. FIGS. 18, 19 and 20 show the process performed thereby.

Resource allocation unit 13 includes send queue function 19, bandwidth determination function 20 and bandwidth instruction function 21.

Resource allocation unit 13 has a resource management table that stores the bandwidths having been allocated to congestion avoidance-type data transfers. FIG. 21 shows a structure of the resource management table.

Send queue function 19 has a FIFO (First In, First Out) queue. When a transmission request comes from a sending station, the contents of the transmission request are stored into the queue (steps S31, S32 and S33). Send queue function 19 always indicates whether a waiting request exists in the queue, to bandwidth determination function 20.

When the completion of the data transfer is informed by a sending station, send queue function 19 deletes the corresponding entry from the resource management table, and sends a resource release signal to bandwidth determination function 20 (steps S31, S34, S35 and S33).

Bandwidth determination function 20 stores the maximum bandwidth of the transmission medium as a constant.

After receiving the bandwidth used by a congestion recovery-type data transfer from resource estimation unit 12, bandwidth determination function 20 updates the corresponding entry in the resource management table in response to the allocation of bandwidth to the congestion avoidance-type data transfer and the acknowledgment of the completion of the data transfer from the sending station.

Bandwidth determination function 20 calculates an empty bandwidth, Rmax, by subtracting Rused and the sum of Ri (i=0, 1, 2, . . . , m; m is the number of continuing congestion avoidance-type transmissions) from Rlink, which is the maximum bandwidth of the transmission medium. Rused is the estimated bandwidth used by congestion recovery-type data transfers. Ri is the bandwidth having been allocated to an existing congestion avoidance-type data transfer.

Thus, Rmax is calculated by using the following expression (6).

$$R_{max} = R_{link} - R_{used} - \sum_{i=1}^{m} R_i \quad (6)$$

$R_{max}$: CalculatedEmptyBandwidth $R_{link}$: MaximumBandwidthofTransmissionMedium(Constant)

$R_{used}$: EstimatedBandwidthUsedby
CongestionRecovery_TypeDataTransfers $R_i$: BandwidthAllocatedtoEach
CongestionAvoidance_TypeDataTransfer[bps]

$m$: Number of CongestionAvoidance_typeDataTransfer $R_{USED'}$ can be used instead of $R_{USED}$ in equation (6).

Bandwidth determination function 20 allocates a bandwidth to the first transmission request queued in send queue function 19 within the calculated empty bandwidth. In more detail, first, the head transmission request in the send queue is selected and analyzed so as to determine the requested bandwidth (steps S41 and S42). Then, an empty bandwidth is calculated. If there is enough empty bandwidth for the requested bandwidth, the bandwidth for the data transfer is determined (steps S43 and S44). An entry for the requested bandwidth is added to the resource management table (step S45). The determined bandwidth is sent to bandwidth instruction function 21 (step S46). If there is not enough empty bandwidth for the requested bandwidth, the transmission request is queued by send queue function 19 until enough bandwidth is prepared by completing some other data transfer (step S47).

Bandwidth instruction function 21 creates a transmission instruction including the bandwidth determined by bandwidth determination function 20, and sends the transmission instruction to the sending station that sent the transmission request (steps S51–S53).

Figure 22:
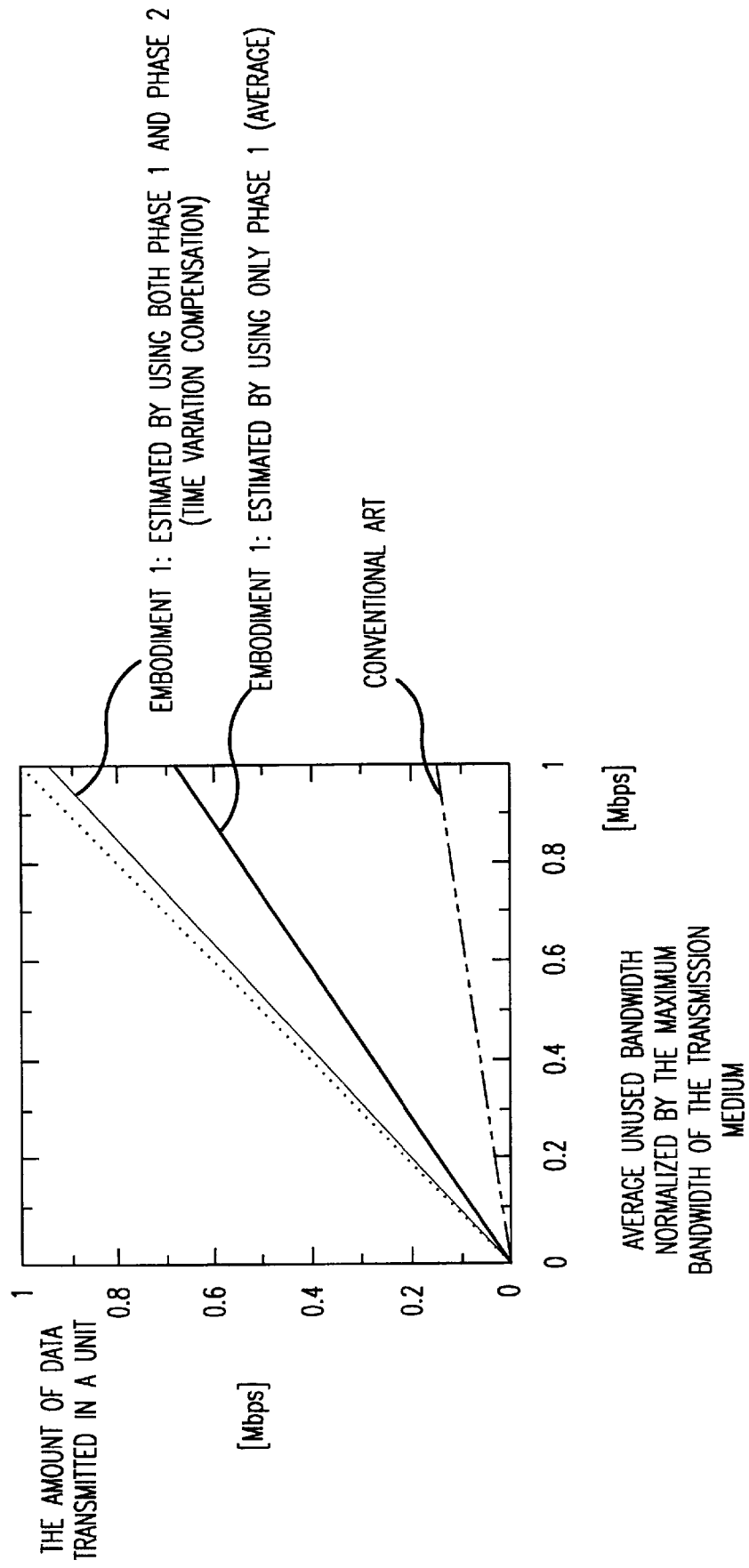
FIG. 22 is a graph comparing the first embodiment to prior art techniques.

According to this embodiment, the transmission efficiency of congestion avoidance-type data transfers at the entrance of server 111 is evaluated on the condition that clients 110a and 110b respectively perform congestion recovery-type data transfer and congestion avoidance-type data transfer to server 111 simultaneously. FIG. 22 shows an example of the evaluated results. Here, the following conditions were used in consideration of typical service, such as print service.

(1) Number of avoidance-type data transfers (Number of pieces of data simultaneously transmitted): 1 This data transfer can use the maximum bandwidth of the transmission medium.

(2) Number of recovery-type data transfers: minimum=1, and maximum=20. This depends on the empty bandwidth of the network. In addition, the representative value of the bandwidth is set as 4% of the maximum bandwidth of the transmission medium. The time variation of a bandwidth of a data transfer follows the Poison process.

(3) Criterion to determine the congestion state: Data loss rate>$10^{-7}$.

The utilization rate of the empty bandwidth by the conventional method is at most 15%. Meanwhile, when resource estimation unit 12 estimates the bandwidth used by congestion recovery-type data transfers by using only phase 1 (average), the utilization rate of the empty bandwidth using the present invention is 70%.

Furthermore, when phase 2 (time variation compensation) is used with phase 1, the utilization rate of the empty bandwidth is 95%. Here, the interval between transmissions by the avoidance-type congestion control is set as the control cycle time T in expression (4). The compensation coefficient "a" is experimentally optimized. In addition, it is experimentally understood that the optimum result is obtained when the distribution of the time variations of the congestion recovery-type data transfers is a constant distribution. In other words, the constant rate derives optimum results.

The following value was determined for a cycle time of T=0.33 using a very simple model: a=0.05. It is understood that more complicated models will likely yield a value of a that will provide even better results.

A period given to a congestion avoidance-type data transfer can be divided into intervals so as to set the interval as the control cycle time T of the congestion avoidance control and allocate a bandwidth to each interval. In other words, T in equations (4) or (5) is set as a smaller interval than it would be if the congestion avoidance-type data transfer was not divided. It is also possible to calculate the short time variation based on an interval between arrival times of recovery-type transfer packets, which can be monitored by data transfer monitor 11.

In more detail, short time variation can be calculated by the following equation (A).

$$R_{STV} = V\left[\left(\frac{\text{Data Amount in a Packet [bit]}}{\text{Monitored immediately Preceding interval between packets [sec]}}\right) - R_{USED}\right]_T \quad (A)$$

where $V[\ ]_T$ represents the variance in the immediately preceding interval.

In this case, $R_{USED'}$ can be determined by the following equation (B).

(B) $R_{USED'} = R_{USED} + R_{STV}$

In FIG. 10, the reference number 111a is a program product that stores a program to be installed in server 111 so that server 111 executes the data transfer control of this embodiment. Thus, the method of this embodiment can be implemented on server 111 by using the program. The program product can be a carrier wave in which the program is encoded. The carrier wave can be transmitted, for example, over a communication network such as, for example, the World Wide Web. The carrier wave also can be stored, for example, in ROM or RAM, in a fixed or removable memory (such as a hard drive or a CD ROM), can be provided as part of the overall computer system or sold separately as an add-on.

Figure 23:
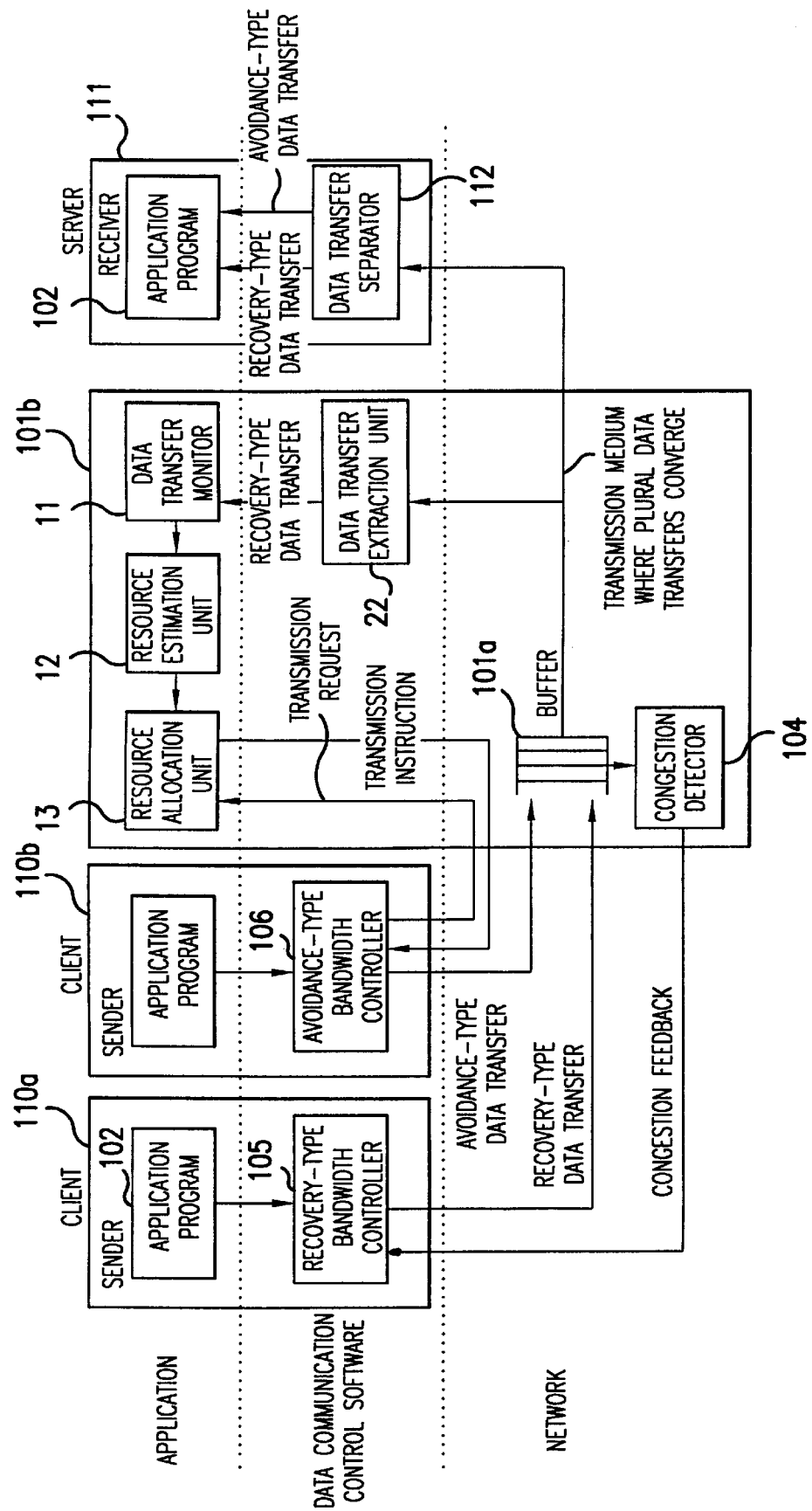
FIG. 23 is a block diagram illustrating a configuration of a second embodiment.

A second embodiment, which also deals with a data transfer apparatus of the server-client model application, will now be described. FIG. 23 shows the configuration of the second embodiment. Clients 110a and 110b perform data transfers to server 111. In other words, clients 110a and 110b are sending stations, and server 111 is a receiving station.

The monitoring point in the second embodiment is different from that of the first embodiment. The second embodiment provides a monitoring point on a connection port of the switch (packet switch 101b). In addition to the monitoring point of the first embodiment, this is another point where congestion recovery-type data transfers and congestion avoidance-type data transfers converge and congestion occurs.

The switches can be located so that congestion recovery-type data transfer and congestion avoidance-type data transfer converge into only the monitoring point, and congestion occurs at only the monitoring point.

The monitoring object in the second embodiment is now explained. The result of a process of an application program is usually transmitted by using a connection-oriented data transfer by a data transfer control program. The connection-oriented data transfer performs control procedures called establishment, maintenance and release of connection for each data transfer by using control packets.

In other words, between the establishment and release of connection executed by the data transfer control program, application programs communicate control information with each other and the result of a process executed by the application programs is transmitted.

Thus, monitoring packets for establishment and release of connection sent by the data transfer control software can be the alternative to monitoring communication of control information between application programs.

Figure 24:
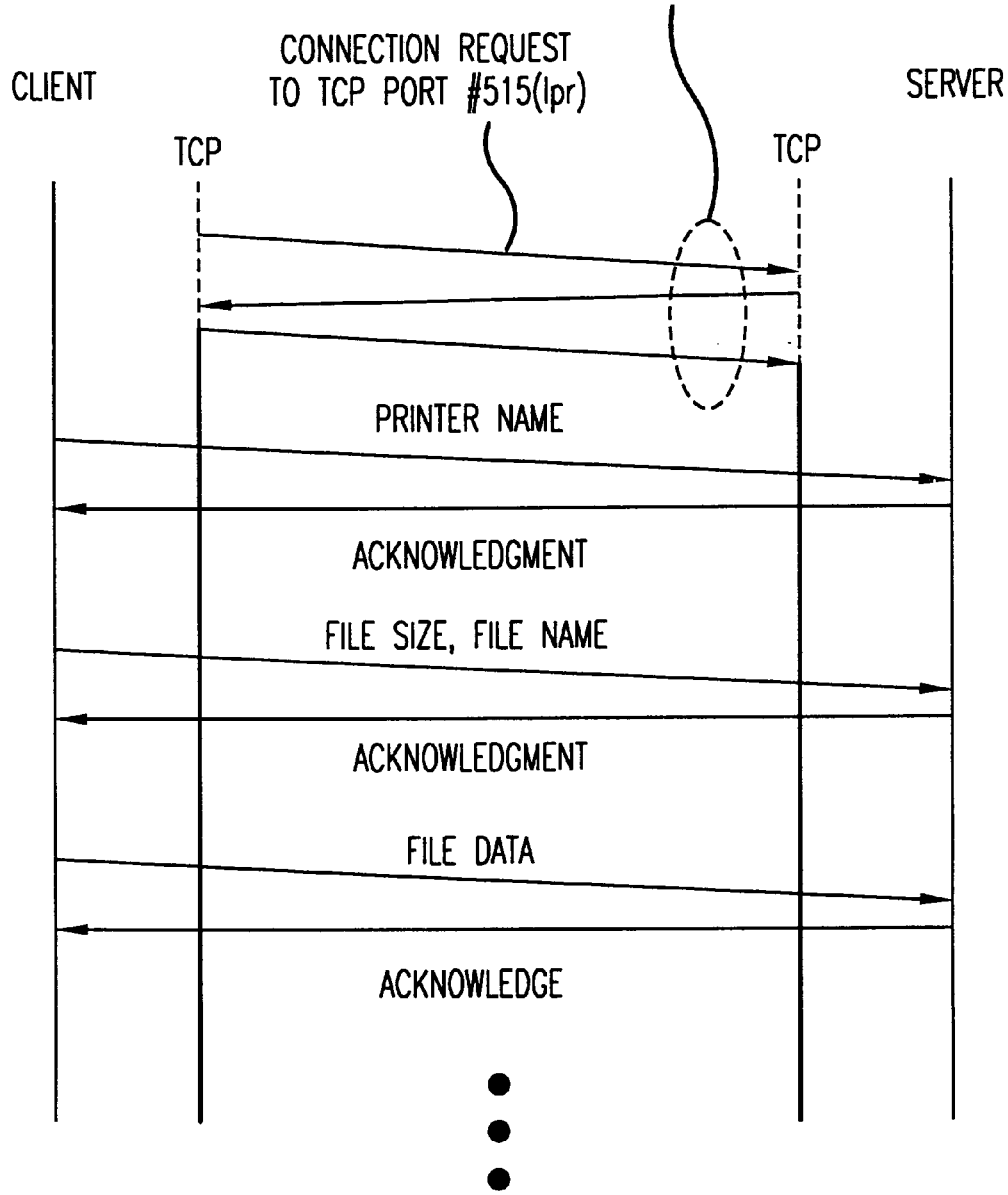
FIG. 24 shows an example (lpr) illustrating a connection process performed by using conventional art TCP.

FIG. 24 shows a connection process using the conventional TCP in an example of lpr (print), which is a common print application on UNIX operating systems. As shown in this figure, prior to a file data transfer, the sender (client) application and the receiver (server) application establish connection by using TCP. Control packets for the establishment and release of the connection also converge into the monitoring point.

Therefore, a period in which a data transfer uses the network resource can be determined by detecting the control packets for the establishment and release of the connection.

Next, the configuration of the data transfer apparatus is explained with reference to FIG. 23. In this figure, the data transfer apparatus of the second embodiment includes client 110a, client 110b, server 111 and packet switch 101b. Client 110a includes recovery-type bandwidth controller 105. Client 110b includes avoidance-type bandwidth controller 106. Server 111 includes data transfer separator 112. Packet switch 101b connects the clients and server with each other, transfers data using packets, and includes buffer 101a, congestion detector 104, data transfer extraction unit 22, data transfer monitor 11, resource estimation unit 12 and resource allocation unit 13.

Recovery-type bandwidth controller 105, congestion detector 104, avoidance-type bandwidth controller 106, data transfer monitor 11, resource estimation unit 12 and resource allocation unit 13 of the second embodiment are the same as those of the first embodiment, respectively, and are not explained here.

Figure 25:
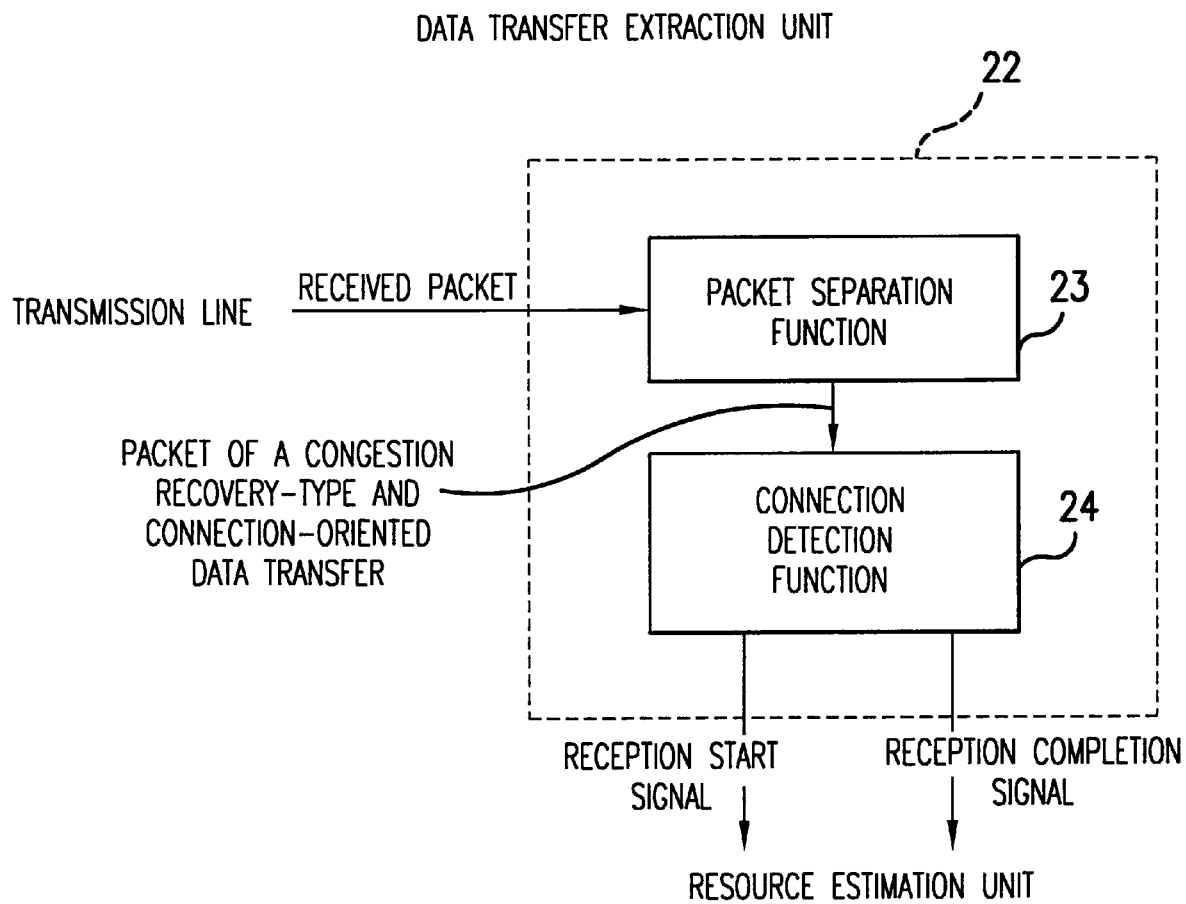
FIG. 25 is a block diagram illustrating a configuration of a data transfer monitor of the second embodiment.
Figure 26:
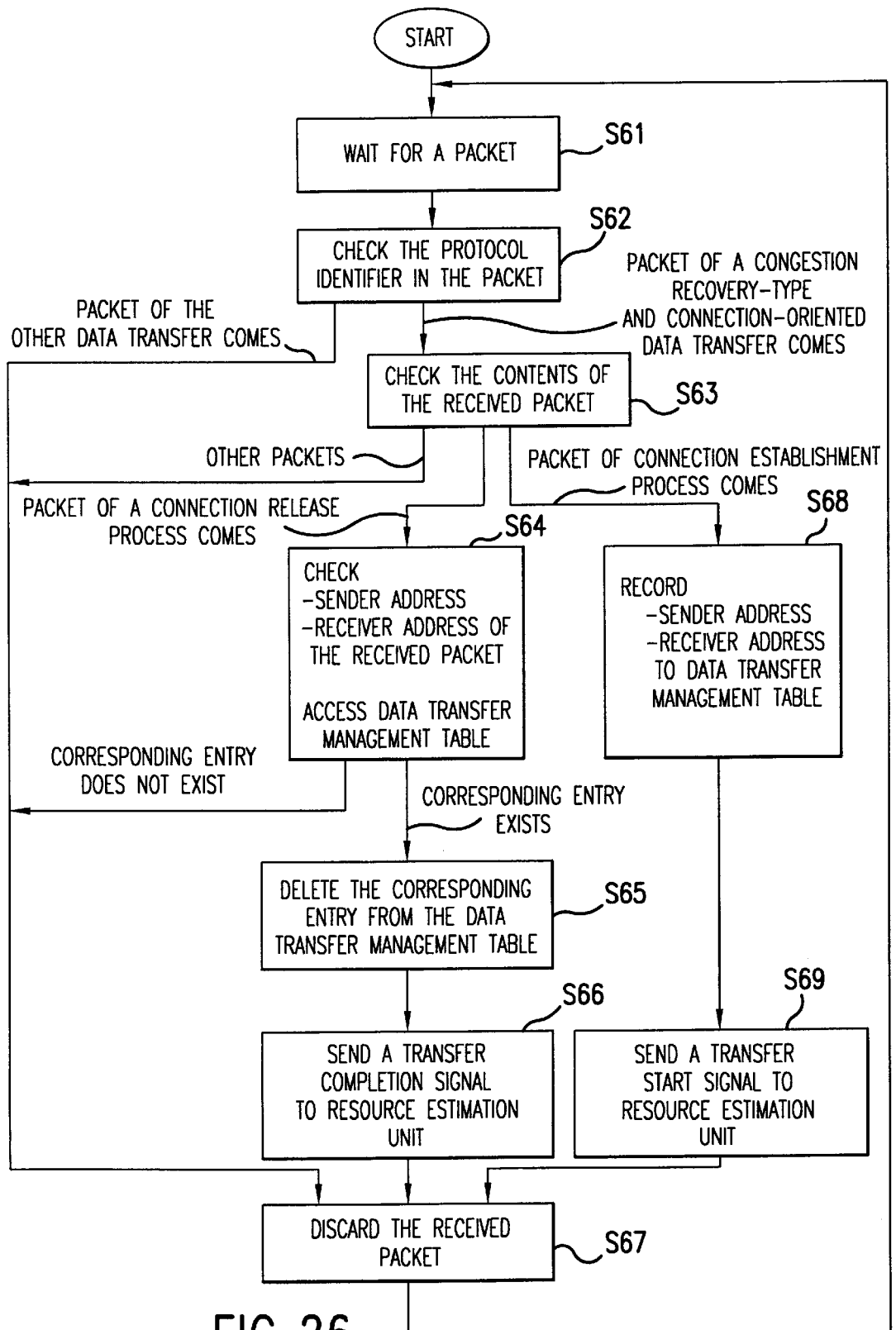
FIG. 26 is a flowchart illustrating a process performed by the data transfer monitor of the second embodiment.

FIG. 25 and FIG. 26 respectively show the configuration and process of data transfer extraction unit 22. Data transfer extraction unit 22 includes packet separation function 23 and connection detection function 24.

Figure 27:
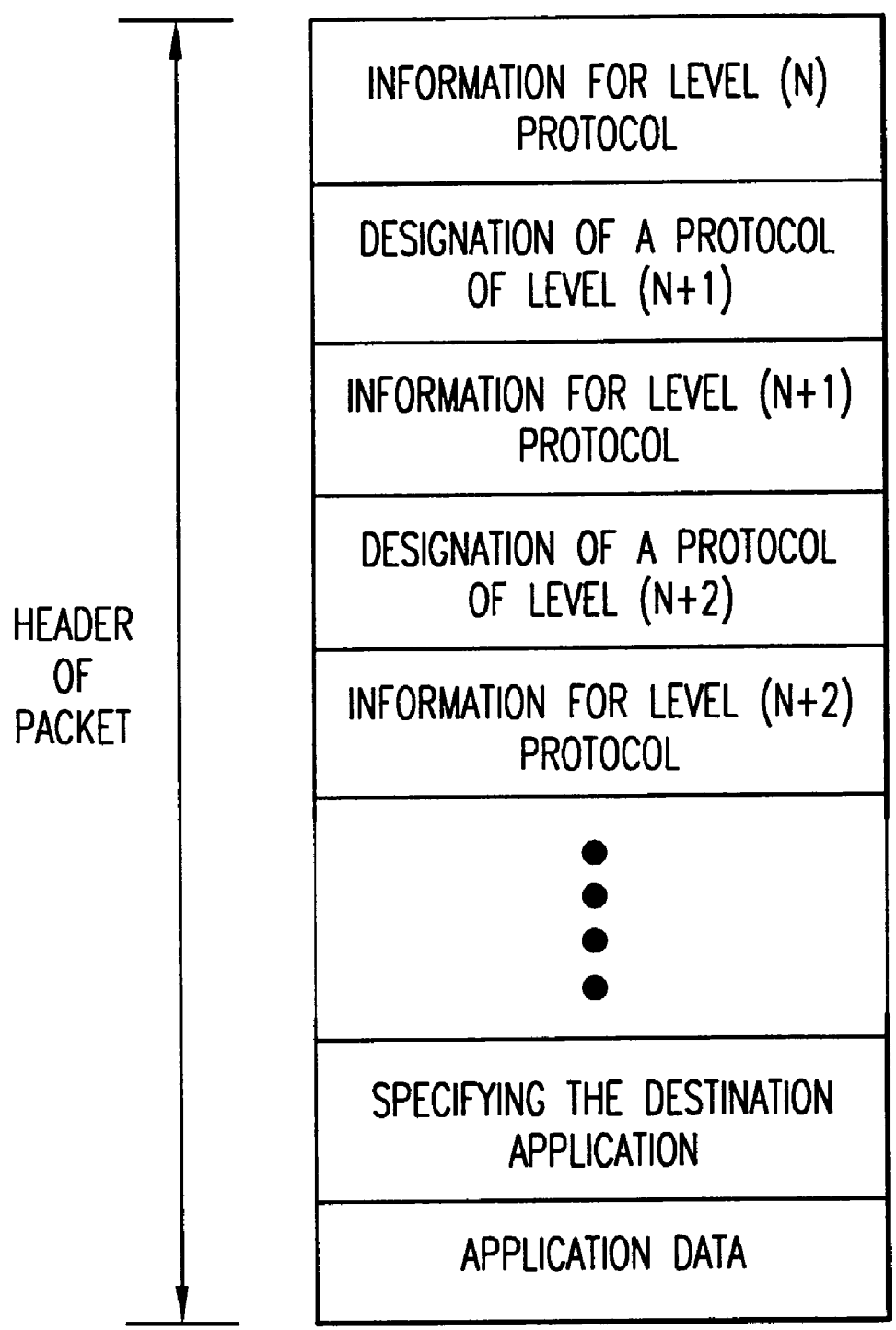
FIG. 27 shows a structure of a header of a packet following the hierarchical data transmission protocol.

Generally, a data transfer control program is implemented as a hierarchical data transfer protocol. A packet created by the hierarchical data transfer protocol has a header that stores protocol control information. FIG. 27 shows a header structure. The protocol information of a level (N) includes a protocol identifier that designates the protocol of the immediate higher level (N+1). FIG. 28 shows a detailed header structure by using conventional TCP/IP (Internet Protocol). FIG. 28 includes information of the connection and protocol designation.

In the data transfer control software, two types of congestion control methods are implemented as two different protocols. Thus, data transfers are classified into two types of congestion control methods by checking the protocol identifiers.

Information for establishment and release of connection is communicated between applications by using a specific field in the header. Thus, by checking the specific field in the header, the sequence of establishment and release of connection can be monitored.

Data transfer extraction unit 22 stores a protocol information table having a structure shown in FIG. 29. The entries consist of a protocol identifier, a congestion control type, a connection type, a connection establishment sequence and a connection release sequence. In this embodiment, congestion control type designates either the recovery-type congestion control or the avoidance-type congestion control. The connection type distinguishes between the connection-oriented and others. The connection establishment sequence (connection release sequence) includes a value of the packet header field regarding the connection establishment (connection release). If the connection is established (or released) by using plural packets, the connection establishment (release) sequence includes a sequence of values of the packet header field.

When receiving a packet from a transmission medium, packet separation function 23 compares the protocol identifier included in the received packet with the entries of the protocol information table (FIG. 29) (steps S61 and S62). If the protocol identifier matches an entry of a congestion recovery-type and connection-oriented data transfer, the received packet is sent to connection detection function 24 (step S63). Otherwise, the received packet is discarded (step S67).

When receiving the packet of a congestion recovery-type and connection-oriented data transfer from packet separation function 23, connection detection function 24 detects whether the received packet requests connection establishment or connection release with the protocol information table. If the received packet requests the connection establishment process, connection detection function 24 sends a reception start signal to resource estimation unit 12 and records the data transfer into the data transfer management table of FIG. 30 (steps S68 and S69). Thus, the data transfer management table includes an entry of the data transfer that is connecting at the moment. On the other hand, if the received packet requests the connection release process, entries of the data transfer management table are checked (step S64). If there is an entry matching the packet, connection detection function 24 sends a reception completion signal to resource estimation unit 12 and deletes the entry from the data transfer management table (steps S65 and S66).

The second embodiment can perform congestion recovery-type data transfers and congestion avoidance-type data transfers simultaneously as the first embodiment does.

According to the present invention, the recovery-type congestion control and the avoidance-type congestion control coexist on a network, and share a transmission medium dynamically. In addition, even if the load is high, it is possible to avoid data losses and to achieve a high transmission rate. Accordingly, without dividing or reconfiguring the network, the congestion control methods can be switched according to applications such that a conventional application uses the recovery-type congestion control and applications performing a large and high-load data transfer use avoidance-type congestion control.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A method of performing data transfers on a network, comprising the steps of:

performing a congestion recovery-type of data transfer of first data; and performing a congestion avoidance-type of data transfer of second data that is different from the first data, the congestion avoidance-type of data transfer being performed simultaneously with the congestion recovery-type of data transfer;

the congestion recovery-type of data transfer changing a transfer rate of the first data based upon congestion detected on the network, whereas the congestion avoidance-type of data transfer does not chance a transfer rate of the second data based on the congestion detected on the network.

2. A data transfer apparatus in a network system that includes a first computer, a plurality of second computers and a network connecting the first computer and the plurality of second computers with each other, the plurality of second computers performing data transfers to the first computer simultaneously through an identical path on the network in accordance with requests from applications on the plurality of second computers, the data transfer apparatus comprising:

a congestion detector that detects congestion on the network;

a first transfer controller that starts a first type of data transfer using an amount of the network and decreases the amount of the network used by the first type of data transfer in accordance with congestion detected by the congestion detector;

a resource monitor that monitors the first type of data transfer to calculate the amount of the network used by the first type of data transfer;

an allocation unit that determines an amount of the network to be used by a succeeding second type of data transfer in accordance with the amount of the network used by the first type of data transfer; and a second transfer controller that starts the succeeding second type of data transfer using the amount of the network determined by the allocation unit, said second transfer controller does not change a transfer rate of the succeeding second type of data transfer based on the congestion detected by the congestion detector.

3. The data transfer apparatus as set forth in claim 2, wherein the resource monitor determines the amount of the network used by the first type of data transfer by monitoring control packets of a connection sequence between the first computer and the second computers.

4. The data transfer apparatus as set forth in claim 2, wherein the resource monitor determines the amount of the network used by the first type of data transfer by estimating a representative value of a bandwidth and a time variation of the bandwidth used by the first type of data transfer.

5. The data transfer apparatus as set forth in claim 4, wherein the resource monitor prepares predetermined relationships between categories and bandwidths, classifies the first type of data transfer as one of the categories according to a process parameter of the application that requests the first type of data transfer, and sets the bandwidth corresponding to the category into which the first type of data transfer is classified as the representative value of the bandwidth.

6. The data transfer apparatus as set forth in claim 5, wherein the process parameter includes at least one of a type of the application, an amount of data to be transferred by the application, and a type of computer on which the application is executed.

7. The data transfer apparatus as set forth in claim 4, wherein the resource monitor estimates the time variation by multiplying a predetermined coefficient by a short time variation of the representative value of the bandwidth.

8. The data transfer apparatus as set forth in claim 2, wherein the allocation unit calculates an amount of the network used by a previous second type of data transfer, calculates an available amount of the network by subtracting the amount of the network used by the first type of data transfer and the amount of the network used by the previous second type of data transfer from a capacity of the network, and determines the amount of the network to be used by a succeeding second type of data transfer to be within the available amount of the network.

9. The data transfer apparatus as set forth in claim 2, wherein the second computers are clients and the first computer is a server.

10. The data transfer apparatus as set forth in claim 2, wherein the first computer is a print server.

11. The data transfer apparatus as set forth in claim 2, wherein the resource monitor is provided on a switch in the network.

12. The data transfer apparatus as set forth in claim 2, wherein the resource monitor is provided on an entrance of the first computer.

13. The data transfer apparatus as set forth in claim 2, wherein the first computer is a network communication control server.

14. The data transfer apparatus as set forth in claim 2, wherein the first type of data transfer is a congestion recovery-type of data transfer, and the second type of data transfer is a congestion avoidance-type of data transfer.

15. The data transfer apparatus as set forth in claim 2, wherein the allocation unit determines the amount of the network to be used by the succeeding second type of data transfer by dividing the succeeding second type of data transfer into intervals, and the resource monitor calculates a time variation of the bandwidth used by the succeeding second type of data transfer based on an interval between arrival times of packets.

16. A data transfer apparatus that performs data transfers among plural computers connected with each other by a network, the data transfer apparatus comprising:

a congestion detector that detects congestion of the data transfers on the network;

a first transfer controller that performs data transfers among the computers by controlling an amount of the network used by the data transfers in accordance with the detection of congestion by the congestion detector;

a resource monitor that monitors an amount of the network used by the data transfers on a path where the data transfers converge; and a second transfer controller that performs a succeeding data transfer using an amount of the network that is determined in accordance with the amount of the network used by the data transfers determined by said resource monitor said second transfer controller does not chance a transfer rate of the succeeding data transfer based on the detection of congestion by the congestion detector.

17. The data transfer apparatus as set forth in claim 16, wherein the resource monitor determines the amount of the network used by the data transfers controlled by the first controller by estimating a representative value of a bandwidth and a time variation of the bandwidth used by the data transfers controlled by first controller.

18. The data transfer apparatus as set forth in claim 16, wherein one of the plurality of computers is a print server.

19. The data transfer apparatus as set forth in claim 16, wherein the resource monitor is provided on a switch in the network.

20. The data transfer apparatus as set forth in claim 16, wherein the data transfers controlled by the first controller are congestion recovery-type of data transfers, and the succeeding data transfer controlled by the second controller is a congestion avoidance-type of data transfer.

21. A method for performing data transfers between a plurality of computers connected with each other by a network, comprising the steps of:

detecting congestion on the network;

performing data transfers among the computers by controlling an amount of the network used by the data transfers in accordance with the detection of congestion;

monitoring an amount of the network used by the data transfers on a path where the data transfers converge; and performing a succeeding data transfer using an amount of the network that is determined in accordance with the amount of the network used by the data transfers determined by said monitoring, said succeeding data transfer taking place at a transfer rate that does not change based on the detection of congestion.

22. The method as set forth in claim 21, wherein the monitoring step includes determining the amount of the network used by the data transfers controlled in accordance with the detection of congestion by estimating a representative value of a bandwidth and a time variation of the bandwidth used by the data transfers controlled in accordance with the detection of congestion.

23. The method as set forth in claim 22, wherein the monitoring step includes preparing predetermined relationships between categories and bandwidths, classifying the data transfer controlled in accordance with the detection of congestion as one of the categories according to a process parameter of the application that requests the data transfer, and setting the bandwidth corresponding to the category into which the data transfer is classified as the representative value of the bandwidth.

24. The method as set forth in claim 23, wherein the process parameter includes at least one of a type of the application, an amount of data to be transferred by the application, and a type of computer on which the application is executed.

25. The method as set forth in claim 22, wherein the monitoring step includes estimating the time variation by multiplying a predetermined coefficient by a short time variation of the representative value of the bandwidth.

26. The method as set forth in claim 21, wherein one of the plurality of computers is a print server.

27. The method as set forth in claim 21, wherein the monitoring step is performed on a switch in the network.

28. The method as set forth in claim 21, wherein the data transfers controlled in accordance with the detection of congestion are congestion recovery-type of data transfers, and the succeeding data transfer is a congestion avoidance-type of data transfer.

29. A carrier wave encoded to transmit a control program that is readable by a computer performing data transfers over a network, the control program including instructions for causing the computer to execute the steps of:

detecting congestion on the network;

performing data transfers among computers connected with each other by the network by controlling an amount of the network used by the data transfers in accordance with the detection of congestion;

monitoring an amount of the network used by the data transfers on a path where the data transfers converge; and performing a succeeding data transfer using an amount of the network that is determined in accordance with the amount of the network used by the data transfers determined by said monitoring, said succeeding data transfer taking place at a transfer rate that does not change based on the detection of congestion.

30. The carrier wave as set forth in claim 29, wherein the carrier wave is stored on a recording medium that is readable by the computer performing the data transfers.

31. The carrier wave as set forth in claim 29, wherein the instructions for the monitoring step include instructions to determine the amount of the network used by the data transfers controlled in accordance with the detection of congestion by estimating a representative value of a bandwidth and a time variation of the bandwidth used by the data transfers controlled in accordance with the detection of congestion.

32. The carrier wave as set forth in claim 31, wherein the instructions for the monitoring step include instructions to prepare predetermined relationships between categories and bandwidths, classify the data transfer controlled in accordance with the detection of congestion as one of the categories according to a process parameter of the application that requests the data transfer, and set the bandwidth corresponding to the category into which the data transfer is classified as the representative value of the bandwidth.

33. The carrier wave as set forth in claim 32, wherein the process parameter includes at least one of a type of the application, an amount of data to be transferred by the application, and a type of computer on which the application is executed.

34. The carrier wave as set forth in claim 31, wherein the instructions for the monitoring step include instructions to estimate the time variation by multiplying a predetermined coefficient by a short time variation of the representative value of the bandwidth.

35. The carrier wave as set forth in claim 29, wherein the computer is a print server.

36. The carrier wave as set forth in claim 29, wherein the data transfers controlled in accordance with the detection of congestion are congestion recovery-type of data transfers, and the succeeding data transfer is a congestion avoidance-type of data transfer.

* * * * *